Aug. 23, 1955 P. L. LAW 2,715,950
ARTICLE DISPENSING SYSTEMS
Filed Oct. 30, 1951 12 Sheets-Sheet 1

Inventor
Peter L. Law
By Ward, Crosby & Neal
Attorneys

Aug. 23, 1955 P. L. LAW 2,715,950
ARTICLE DISPENSING SYSTEMS
Filed Oct. 30, 1951 12 Sheets-Sheet 2

*Inventor*
*Peter L. Law*
By *Ward, Crosby & Neal*
*Attorneys*

Aug. 23, 1955    P. L. LAW    2,715,950
ARTICLE DISPENSING SYSTEMS
Filed Oct. 30, 1951    12 Sheets-Sheet 3

Inventor
Peter L. Law
By Ward, Crosby & Neal
Attorneys

Aug. 23, 1955 P. L. LAW 2,715,950
ARTICLE DISPENSING SYSTEMS
Filed Oct. 30, 1951 12 Sheets-Sheet 5

Inventor
Peter L. Law
By Ward, Crosby & Neal
Attorneys

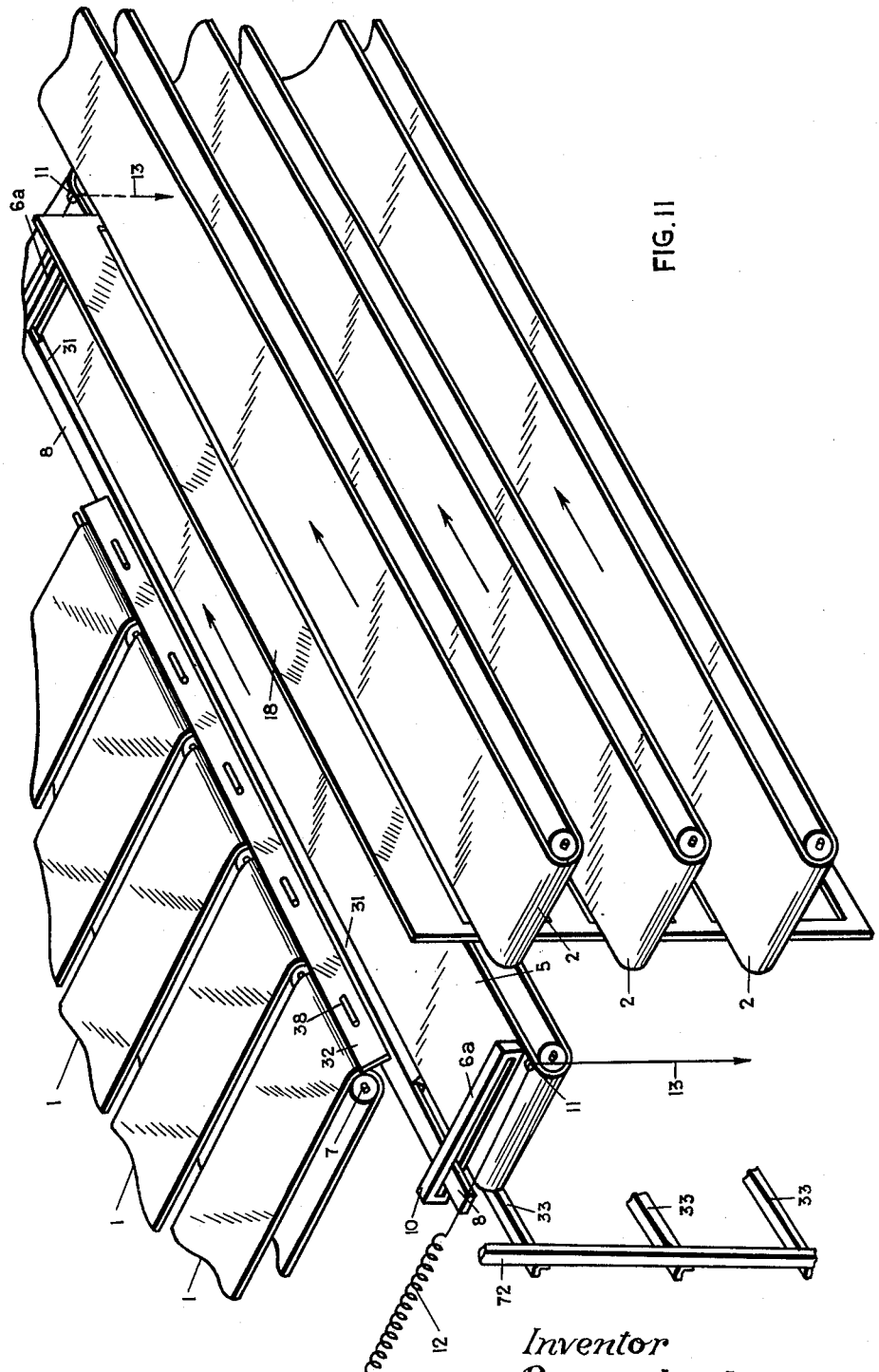

Aug. 23, 1955 P. L. LAW 2,715,950
ARTICLE DISPENSING SYSTEMS
Filed Oct. 30, 1951 12 Sheets-Sheet 7

Inventor
Peter L. Law
By Ward, Crosby & Neal
Attorneys

Aug. 23, 1955    P. L. LAW    2,715,950
ARTICLE DISPENSING SYSTEMS
Filed Oct. 30, 1951    12 Sheets-Sheet 8

Inventor
Peter L. Law
By Ward, Crosby & Neal
Attorneys

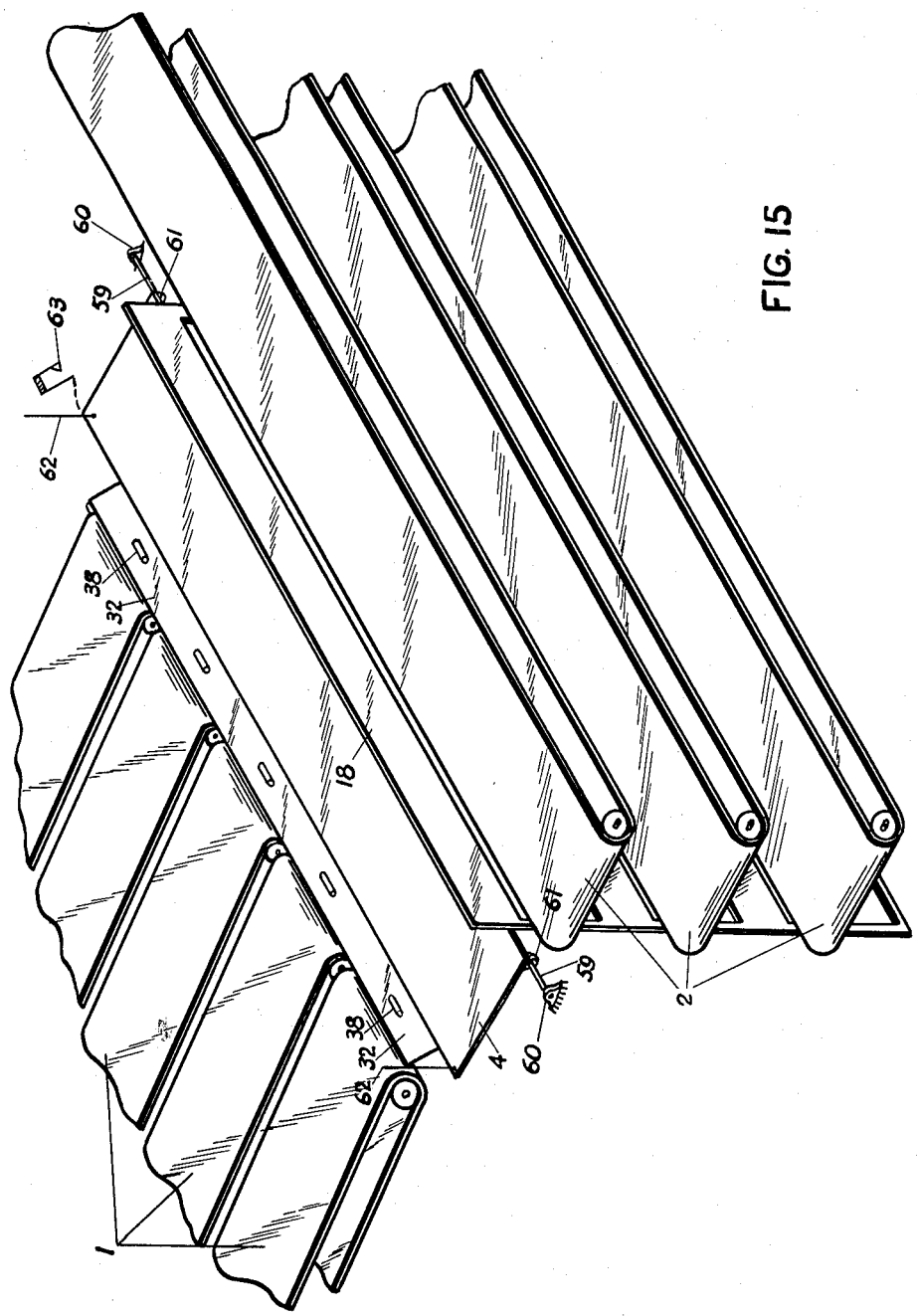

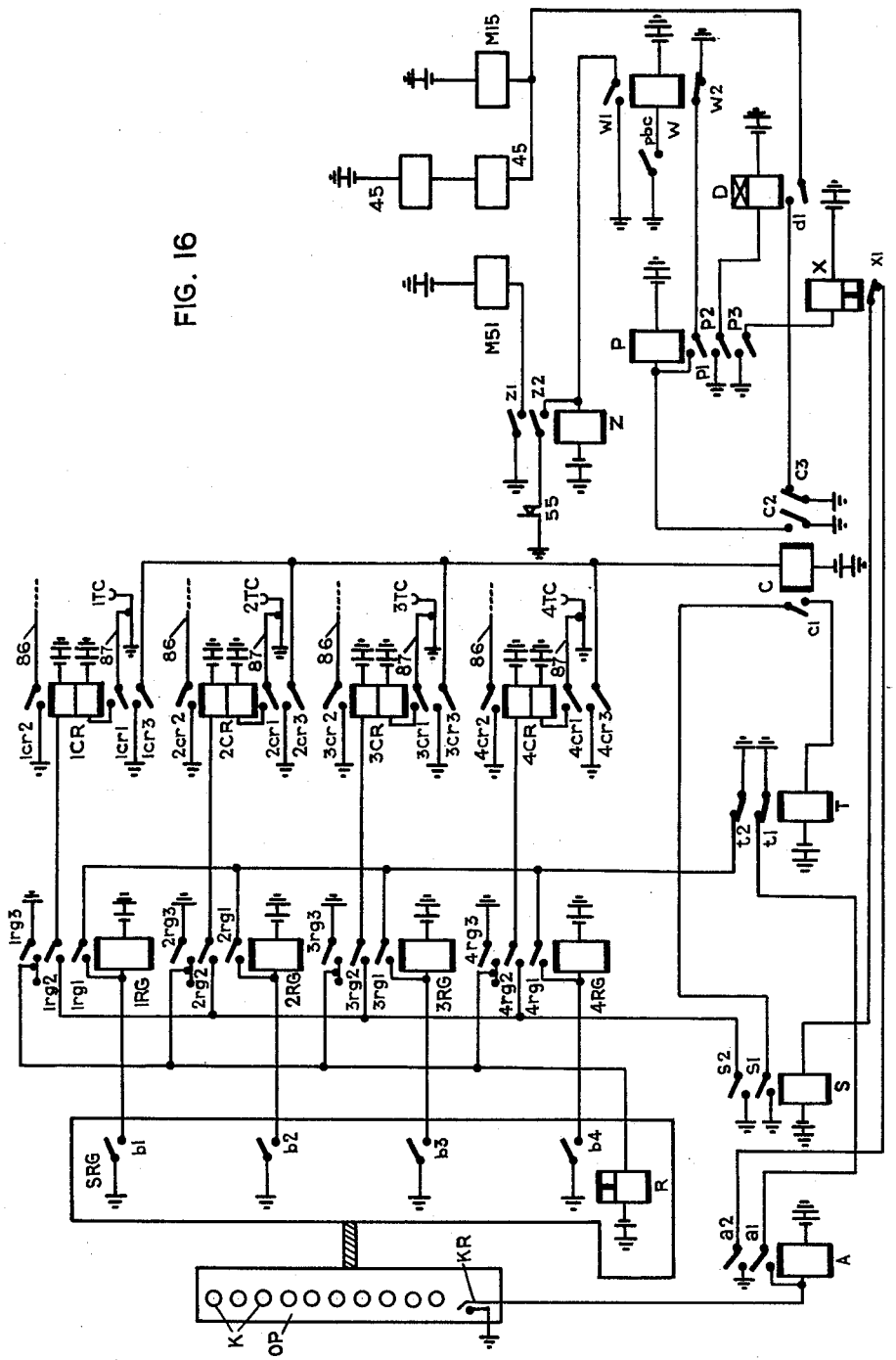

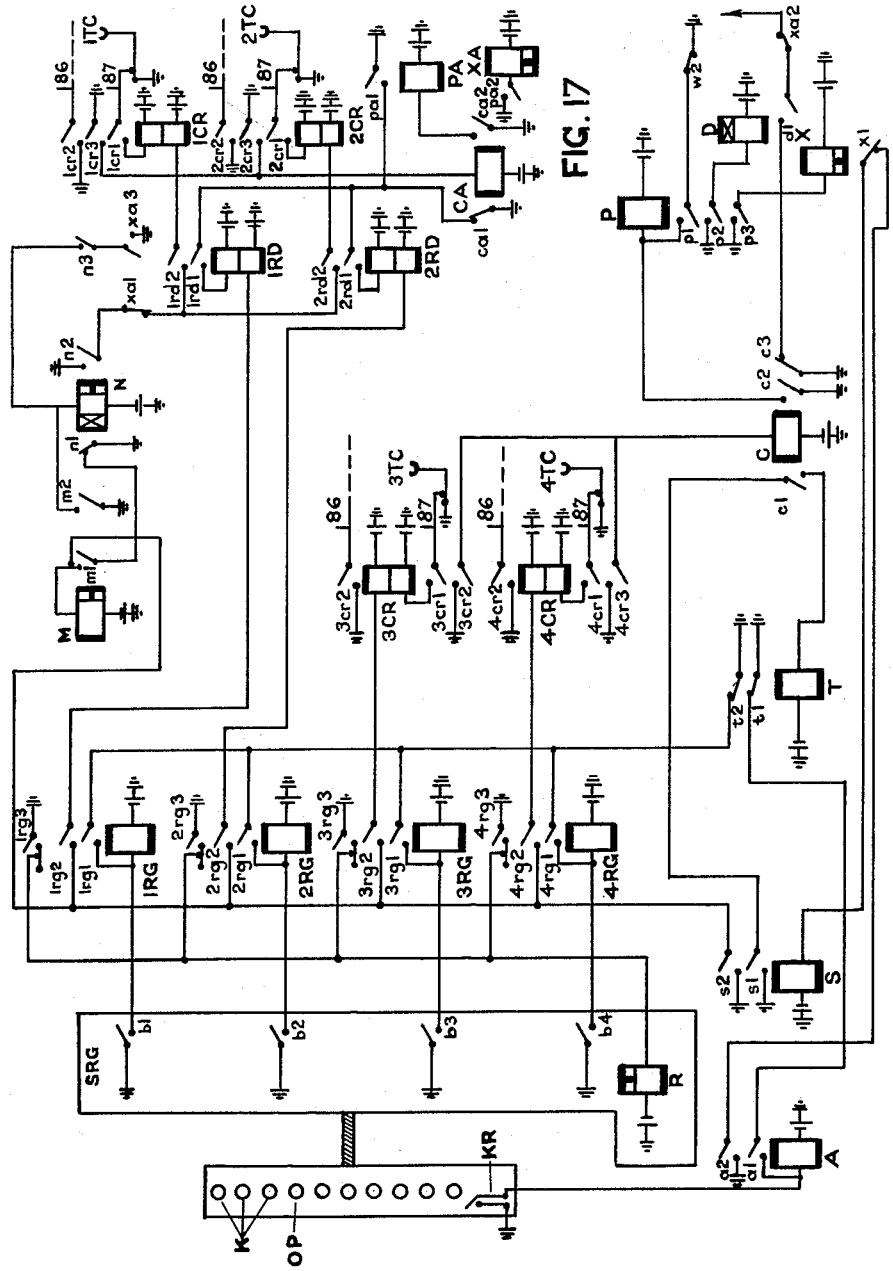

Aug. 23, 1955   P. L. LAW   2,715,950
ARTICLE DISPENSING SYSTEMS
Filed Oct. 30, 1951   12 Sheets-Sheet 12
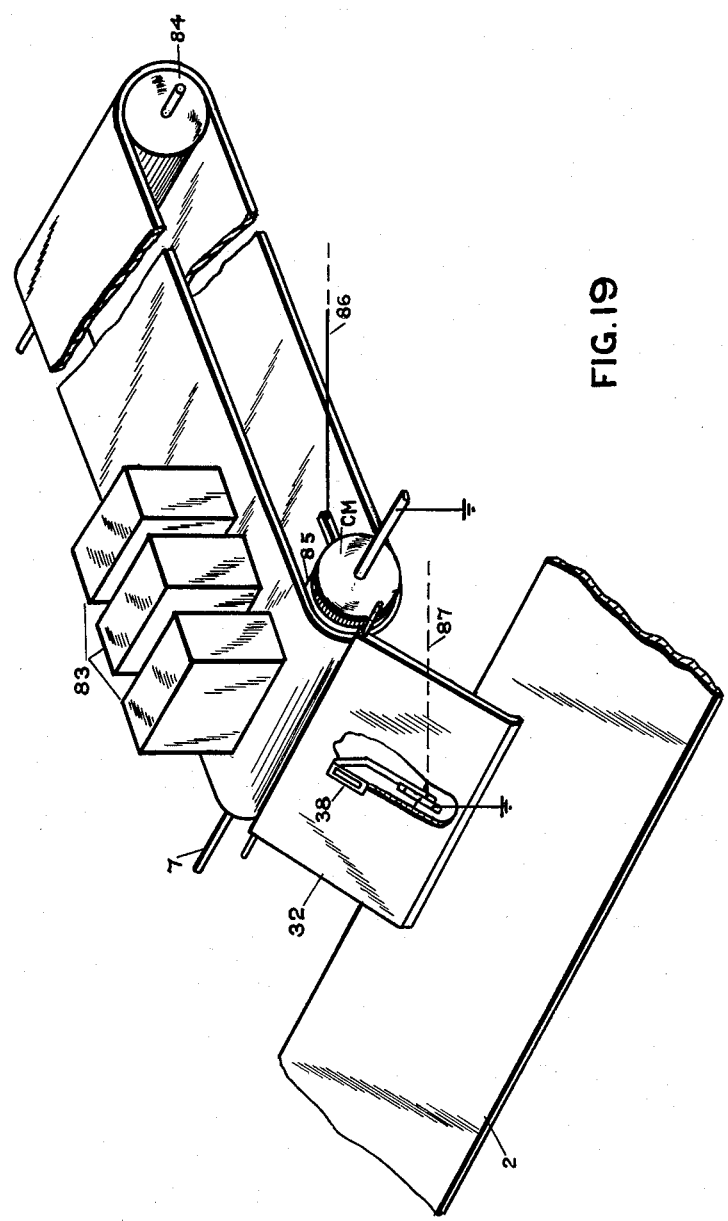
Inventor
Peter L. Law
By Ward, Crosby & Neal
Attorneys

United States Patent Office 2,715,950
Patented Aug. 23, 1955

2,715,950

ARTICLE DISPENSING SYSTEMS

Peter L. Law, Roseville, near Sydney, New South Wales, Australia, assignor to Communication Engineering Pty. Limited, Cammeray, near Sydney, New South Wales, Australia, a corporation of Australia Application October 30, 1951, Serial No. 253,786

Claims priority, application Australia November 6, 1950

15 Claims. (Cl. 186—1)

This invention relates to article dispensing systems, and provides improved article handling apparatus for such systems which greatly increases the rate at which separate orders, or batches of articles, can be delivered to a collecting or delivery point.

The invention relates in particular ot the type of article dispensing system in which articles are stored according to kind in or on individual storage devices, and are selectively released by the operation over electrical control circuits of releasing devices individually associated with these storage devices. In such systems the storage devices are commonly arranged in horizontal rows, a conveyor associated with each row running past the releasing ends of all storage devices thereof. For economy of space the rows of storage devices are usually arranged one above the other. Each storage device is adapted on the operation of the associated releasing device to release its articles one by one onto the corresponding conveyor, which transports them to a collecting point. Means are provided, usually operated by the articles themselves on release, to stop the operation of each releasing device when the associated storage device has released an article or, if more than one article of the same kind is required, to alternatively stop and start the operation of the appropriate releasing device until the associated storage device has released the required number of articles.

In an article dispensing system of this type the articles are stored on normally stationary belts, which are selectively moved by the electrical operation of associated clutches to couple them with common driving means. The storage belts are arranged in horizontal rows, a crossbelt runs past the releasing ends of the storage belts of each row, and each storage belt on the operation of its clutch released the required number of articles onto the corresponding crossbelt. The control circuits for the clutches are operated from a keyset. Each kind of article is allotted a code number, and on the operation of the keys representing the code number of any kind of article the belt holding articles of that kind is moved. With this system the operation of the appropriate keys in accordance with the code numbers alotted to the kinds of articles required initiates the automatic release of these articles onto the various cross-belts and their transfer to a common collecting point. An article dispensing system of this type is more fully described in United States Patent No. 2,627,941.

In such systems the rate at which individual articles can be delivered to the collecting point is comparatively high. In the system described in the preceding paragraph for example, a clutch is operated and one or more articles released each time a code number is keyed up. As soon as one clutch finally disengages, another code number can be keyed up and another clutch engaged. Thus the rate at which articles can be released, and consequently the rate at which they can be delivered to the collecting point, is determined either by the rate at which the clutches can be engaged, operate, and be disengaged, or by the rate at which the operator can key up the code numbers, whichever is the lesser.

Difficulties arise, however, when it is desired to deliver batches of articles, the articles of individual orders for example, separately to the collecting point. Since each crossbelt is common to a large number of storage belts the operator must, if the articles are to be delivered in separate orders, wait after keying up the last article of one order until all articles of that order are clear of the storage belts of the row, and for a further short period to separate the orders, before keying up the first article of the next order. Because of this delay such systems are unsuitable for installations requiring the delivery of separate orders at a fast rate.

The major portion of this delay represents the time taken by an article to travel the length of a row of storage belts. This time can theoretically be shortened either by increasing the speed of the crossbelts or by decreasing their length. Neither of these solutions, however, is satisfactory in practice. The speed of the crossbelts is strictly limited by the requirement that articles of various kinds, including bottles, be handled safely, while any decrease in the length of the crossbelts increases the number required to serve a given number of storage belts, and consequently adds to the difficulty of bringing the articles of an order to the collecting point together. Moreover the use of comparatively long crossbelts to serve a large number of horizontally adjacent storage belts adds considerably to the compactness of the system and effects considerable saving of space.

The object of the invention is to increase the rate at which orders can be delivered by a system of the type described without decreasing the length of the crossbelts or increasing the speed at which they move.

It is a feature of the invention to position a receiving device between the releasing ends of a group of storage devices and the common conveyor associated with that group, and when all articles of an order have been released on to the receiving device, to transfer those articles in a batch simultaneously to the common conveyor, so that the articles of a second order can be released on to the receiving device while the articles of the first are still travelling past the group on the conveying means.

It is a further feature of the invention to arrange storage devices in rows, to divide each row of storage devices into sections, and to provide means whereby the articles of an order stored on the devices of subsequent sections are delayed until the articles of the same order stored on the devices of earlier sections are opposite them, when all articles of the order move off together. A receiving device is associated with each section, and means are provided to move articles released from a section in a batch away from the releasing ends of the storage devices thereof, so that articles of a second order can be released while the articles of the first are still travelling past the section.

According to the latter feature of the invention the electrical control circuits may be such that the article designations fed into the system are stored in an electrical register, and are later transmitted from the register to the appropriate releasing devices. The register holds the designations of the articles of individual orders as separate groups, and when signalled to do so (or at predetermined time intervals) transmits an order and causes the release of the articles comprising it either simultaneously or in a desired sequence of blocks.

The register may be adapted to receive article designations from a plurality of operators, so that the order dispensing rate of the system will be independent of the rate at which article designations can be fed into it by a single operator.

These and further features of the invention will be more fully understood from the following description in connection with the drawings, in which.

Figure 3:
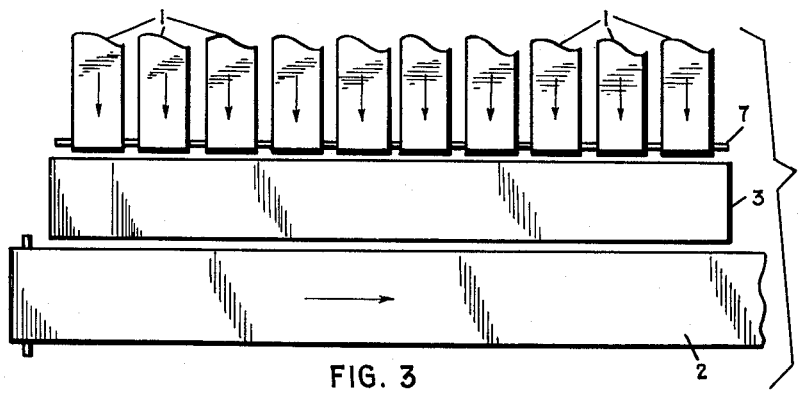

Fig. 3 shows one way in which this arrangement is modified according to the invention. A receiving device 3 separates the releasing end of the storage belt 1 from the crossbelt 2.

Figure 4:
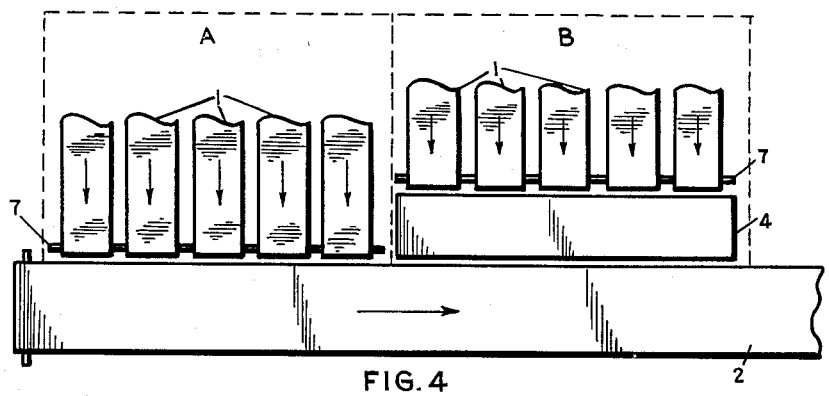
Figure 5:
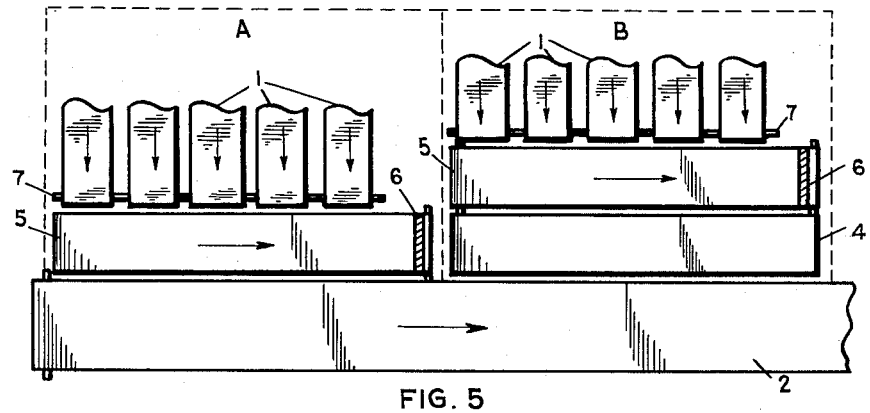
Figure 6:
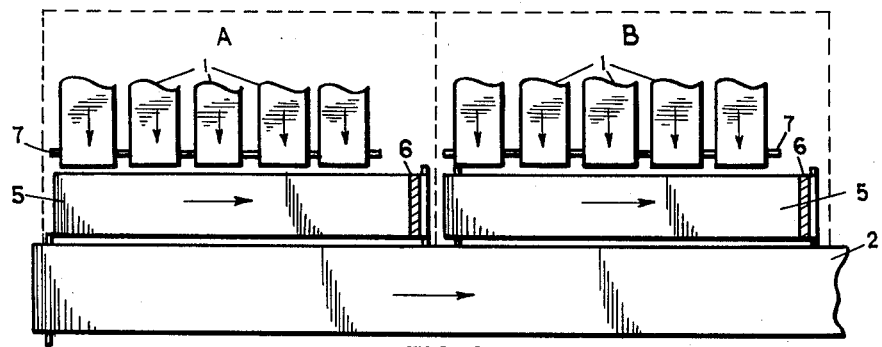

Figs. 4, 5 and 6 illustrate various modifications of the invention in which the row of storage belts 1 is divided into two sections, A and B.

Figure 7:
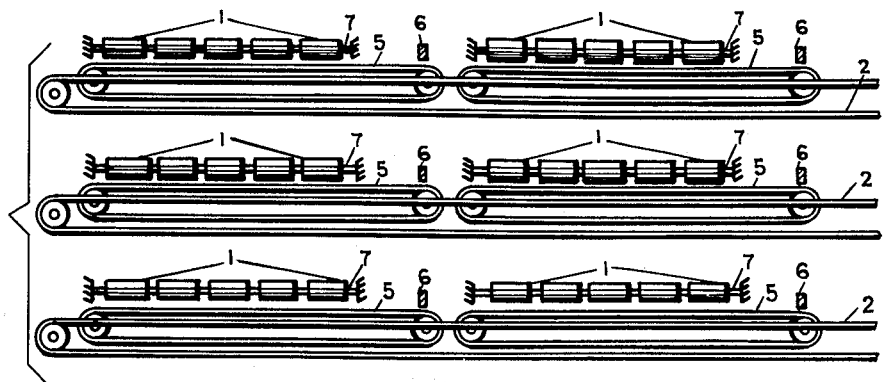

Fig. 7 is a front view of the modification shown in Fig. 6.

Figure 8:
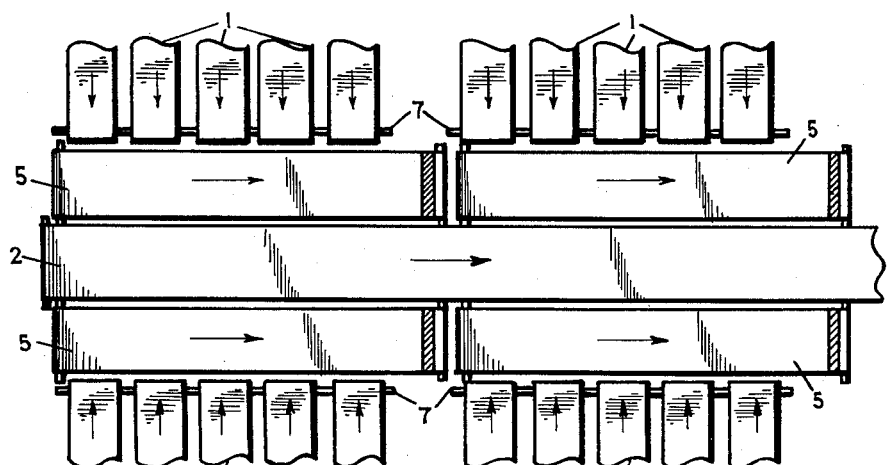

Fig. 8 illustrates an alternative arrangement of the modification shown in Fig. 6.

Figs. 9 to 15 illustrate various arrangements whereby articles may be transferred from a receiving device to a crossbelt.

Figure 18:
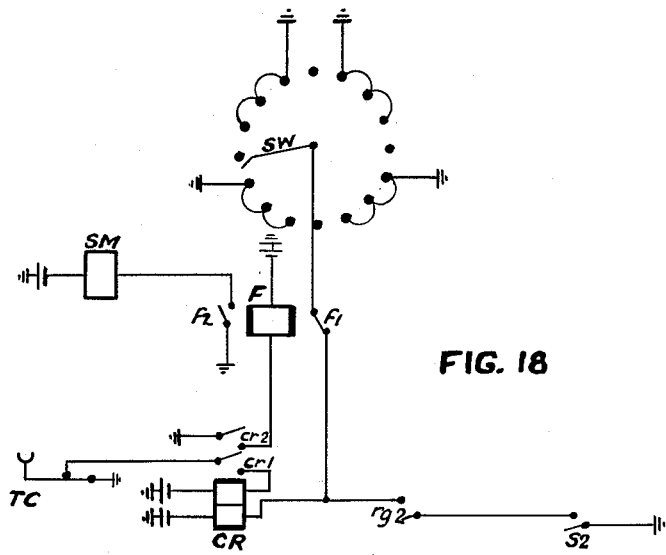

Figs. 16, 17 and 18 show circuits which may be used to carry out various modifications of the invention.

Fig. 19 is an isometric view of a type of storage and releasing device which may be used in connection with the invention.

Referring first to Figure 19 in further detail, the storage and releasing device has a horizontally arranged storage belt 1, carrying articles 83 to be dispensed. The belt 1 passes around rollers 84 and 85 and the roller 85 contains an electromagnetic clutch CM mounted on a constantly running shaft 7, so that, when the clutch CM is energised, the storage belt 1, which carries the articles 83, moves forward until an article topples over the roller 85 onto the conveyor 2. The clutch CM is operated by an electric circuit over wire 86. When an article topples from the storage belt 1, it slides over a flap 32 and operates a trip contact 38 which is effective by means of an electric circuit over wire 87 to release the clutch CM and thus prevent the release of the next article on belt 1.

Figure 1:
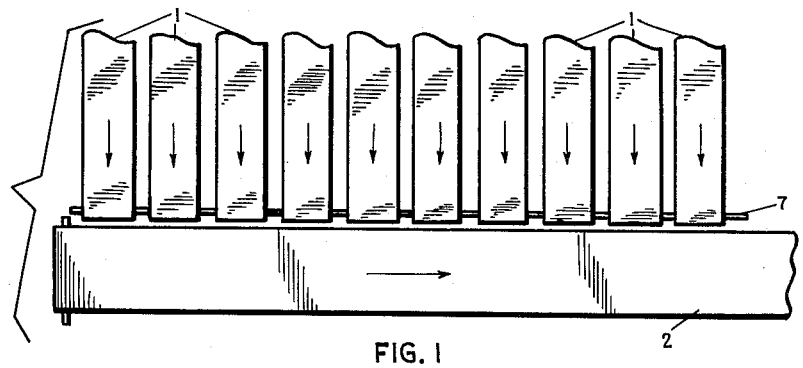
Fig. 1 is a top view of a horizontal row of storage belts 1 with their associated crossbelt 2.
Figure 2:
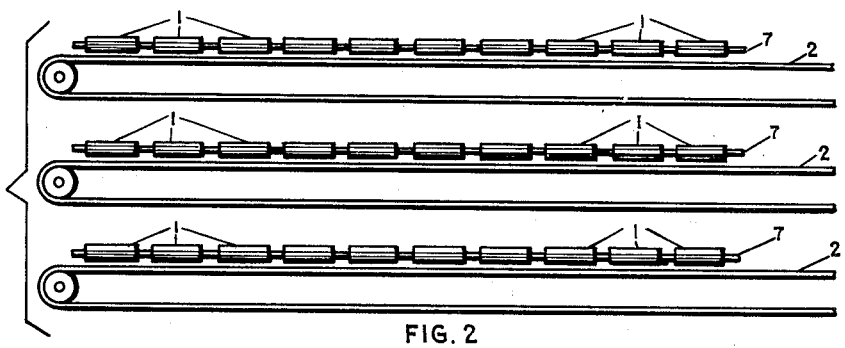
Fig. 2 is a front view of the same arrangement, and shows a number of rows of storage belts arranged vertically above each other.

Fig. 1 as mentioned above is a top view of a horizontal row of storage belts 1 with their associated crossbelt 2. Ten storage belts only are shown in the row, but in practice the number may be far in excess of this. Fig. 2 is a front view of the same arrangement and shows how a plurality of rows of storage belts 1, each with its own crossbelt 2, may be arranged in vertical relationship to utilise a given storage space to the fullest extent.

The articles to be dispensed are stored according to kind on the storage belts 1. A constantly rotating shaft 7 forms a common axle for the driving rollers of the belts 1, each roller being associated with an electromagnetic clutch (CM in Fig. 19). Each roller, on the operation of its associated clutch, is connected with and rotated by the constantly rotating shaft 7, so that the corresponding storage belt 1 is moved in the direction indicated by the arrows and releases the required number of articles onto the crossbelt 2. The clutch is finally disengaged by a contact (38 in Fig. 19) which is operated by the articles as they are released. The crossbelt 2 is constantly moving in the direction indicated by the arrow, and transports the articles to a common collecting point.

The various clutches are selectively operable from a remote point over electrical circuits, as disclosed for example in United States Patent No. 2,535,461. When the coded designation of any kind of article is keyed into the machine by an operator at the remote point, the clutch associated with the storage belt 1 holding that kind of article is operated, and the belt releases the required number of articles onto the crossbelt 2.

If one article only is required, that article on its release operates a contact which disengages the clutch and thus stops further movement of the storage belt and the release of further articles. The release of more than one article of the same kind by keying up the coded designation of that kind of article once only, may be effected by employing an additional arrangement for quantity selection as, for example, described later on in connection with Fig. 18, the clutch in this case being finally disengaged on the release of the last article.

When the required number of articles, be it one or more, has been released, or rather when the clutch has been operated for the last time—a fraction of a second before the release of the last article—the coded designation of the next article may be keyed into the machine. Thus the rate at which articles are released depends on the speed of the operator and on the speed at which the clutches are operated by the control circuits. Normally the latter is the greater speed, so that it is the speed of the operator which determines the rate at which articles are released.

It will be apparent from Figs. 1 and 2 that if it is desired to deliver individual batches of articles, for example the articles of individual customers' orders, separately to the collecting point, the operator must wait at least until the last article of the first order is clear of all storage belts before keying the first article of the next order. Otherwise the latter article might become mixed on a crossbelt with the articles of the first order. To determine a fixed order delivery rate for the system and the time interval during which the operator has to wait before keying up a new order, it must be assumed that the last article of each order will come from a storage belt on the extreme left (in Figs. 1 and 2) of a horizontal row. Thus the operator must wait between orders for the time taken by an article to travel on a crossbelt 2 the length of a row of storage belts 1, plus a further short time to separate the last article of one order from the first article of the next order. The latter delay is necessary because it must be assumed further that the first article of each order will come from a storage belt on the extreme right of a row. Thus any fixed rate for the delivery of orders cannot exceed one order in the time taken by the operator to key up all articles of an order, plus the time taken by an article to travel on a crossbelt 2 the length of a row of storage belts 1, plus a short interval to separate the orders. The last mentioned time interval may be termed "separation delay."

Fig. 3 is a top view showing the arrangement illustrated in Figs. 1 and 2 modified in accordance with one embodiment of the invention. The control system used with this embodiment is the same as that described above in connection with Figs. 1 and 2, so that the storage belts are selectively moved one after the other.

In this embodiment, which greatly increases the rate at which separate orders can be delivered, the releasing ends of the storage belts 1 are separated from the crossbelt 2 by a receiving member 3, and articles are released from the storage belts 1 not directly onto the crossbelt 2, but onto the receiving member 3. When all articles of an order have been released they are moved in a body from the receiving member to the crossbelt. The operator can then key up and release the articles of the next order, while the articles of the first order are still travelling on the crossbelt 2 past the row of storage belts 1. When the last article of the first order is clear of the row of storage belts, the operator can, after a short separation delay, move the articles of the next order from the receiving member to the crossbelt, and so on. Assuming that the time taken by the operator to key up the articles of an order is no longer than the time taken by an article to travel, on the crossbelt the length of the row of storage belts, orders can be delivered at the rate of one in the time taken by an article to pass the length of the row of storage belts, plus a short separation delay. Two operations, the keying up of an order and the passage of the articles of an order along the length of the row of storage belts, which occur in sequence in the arrangement illustrated in Figs. 1 and 2 and so combine to reduce the order delivery rate, occur simultaneously in the embodiment of the invention illustrated in Fig. 3, the order delivery rate being consequently increased. If the time taken by the operator to key up the articles of an order exceeds the time taken by an article to travel the length of the row of storage belts, the order delivery rate of the system is one in the time taken by an article to pass the length of the row of storage belts, plus a short separation delay, plus the excess of the time taken to key up an order over the time taken by an article to travel the length of the row of storage belts. In this case also the order delivery rate of the arrangement illustrated in Figs. 1 and 2 is considerably improved.

The article delivery rate is further increased in the embodiment of the invention illustrated in Figs. 4, 5 and 6. Each of these figures illustrates a top view of an arrangement in which the rows of storage belts are divided into sections, and the articles of an order stored on the belts of subsequent sections are delayed until the articles of the same order stored on the belts of earlier sections are opposite them, when all articles of the order move off together. In Figs. 4 and 5 this delay is effected mechanically, in Fig. 6 electrically.

In the embodiment illustrated in Fig. 4, the rows of storage belts 1 are each divided into two sections, A and B. The figure shows only one level of storage, receiving and conveying means but a similar arrangement would be appropriate for further rows of belts as shown in Fig. 2. The articles stored on the storage belts of section A are released directly onto the crossbelt 2, while the articles stored on the storage belts of section B are released in the first place onto a receiving plate 4, and are later moved in a body onto the cross belt 2. The electrical control circuits used in connection with this embodiment are such that all storage belts holding articles required for an order begin to move simultaneously. The operator keys into the system the coded designations of the articles required, and the quantity in which each is required. When a complete order has been keyed into the system, a key is pressed which causes all selected clutches to engage simultaneously, and thus initiates the release of the wanted articles. If no more than one article of any one kind is required for an order, the articles of the order are released simultaneously. If more than one article of the same kind is required, the storage belt holding that kind of article will continue to release articles, after the other storage belts selected for the same order have been halted, until the required quantity has been released. Electrical circuits which may be used to achieve this latter result are described later in connection with Fig. 18.

If it be assumed that it takes an article eight seconds to travel on the crossbelt 2 the whole length of the row of storage belts 1, four seconds to pass the storage belts of section A and four to pass the storage belts of section B, this embodiment provides an order delivery rate of one every six seconds if no order is to comprise more than one of any one kind of article, and of one every ten seconds if more than one article of the same kind may be included in an order and four seconds releasing time is allowed for the whole order, so that the order is completely released at the latest four seconds after the clutches selected for that order are first engaged and the first articles of the order released.

Considering first the case in which no order is to comprise more than one of any one kind of article, all articles of an order are released simultaneously, those from section A directly onto the crossbelt 2, those from section B onto the receiving plate 4. Even if one of the articles released from section A comes from a storage belt on the extreme right, all articles from section A will be confined to a space on the crossbelt not greater than the length of the section, that is a space equivalent to four seconds' travel on the crossbelt. Four seconds after the release of the articles, when the portion of the crossbelt holding the articles from section A is opposite section B and the receiving plate, the articles released from section B are moved in a body from the receiving plate to the crossbelt, and the whole order moves off together occupying a space on the crossbelt not greater than the equivalent of four seconds' travel thereon. In the meantime the operator has been keying the next order into the system, and after two seconds separation delay can release the articles of this order. The last article of the first order must by this time be at least half way along section B, and even if an article of the next order comes from the storage belt on the extreme right of section A, it will be separated by at least a space equivalent to two seconds' travel on the crossbelt from the last article of the preceding order. Thus an order delivery rate of one every six seconds can be achieved.

If an order may comprise more than one article of the same kind and four seconds releasing time is allowed, the rate of delivery of separate orders is one every ten seconds. An order is delivered from section A onto the crossbelt and from section B onto the receiving plate. Four seconds later the order has been completely delivered, and the articles from section A are stretched along the crossbelt opposite both section A and section B, the space occupied on the crossbelt being equivalent to eight seconds' travel, while the articles from section B are on the receiving plate. The articles from section B are at this stage moved in a body onto the crossbelt 2. The order thus occupies a space equivalent to eight seconds' travel on the crossbelt. Two seconds later another order can be released. A maximum delivery rate of one order every ten seconds is thus achieved, each order occupying a space equivalent to eight seconds' travel on the crossbelt, and two seconds being allowed between orders to separate them.

The embodiment illustrated in Fig. 4 will also allow orders to be delivered at the rate of one every six seconds while allowing a releasing time of four seconds for up to half of the kinds of articles handled. To achieve this all articles of which more than one may be required for an order and for which four seconds releasing time is to be allowed are stored on the storage belts of section B. The articles of an order stored in section A (of which no more than one of each kind will be required) are released simultaneously onto the crossbelt, and at the same time the articles of the same order begin to be released from section B. Four seconds later the articles from section A are opposite section B and the receiving plate, and the articles from section B are moved over to join them. The whole order occupies a space not greater than the equivalent of four seconds' travel on the crossbelt. Another order can be released two seconds later, a maximum delivery rate of one order every six seconds being thus achieved.

The receiving plate 3 in Fig. 3 may be replaced by a receiving belt moving in the same direction as crossbelt 2 but at a slower speed. This modification is preferred where a number of articles are to be released from the same storage belt, as it lessens the risk of damage from articles falling on each other. Such a receiving belt is described in connection with Fig. 5 and later in connection with Figs. 9 and 11.

The embodiment of the invention illustrated in Fig. 5 allows articles to be dispensed at the rate of one order in six seconds, whether or not a plurality of articles of the same kind may be included in the same order. In this embodiment a receiving belt 5 separates the crossbelt 2 from the storage belts 1 of section A, and a receiving belt 5 and a receiving plate 4 separate the crossbelt from the storage belts of section B. Means are provided (and are described later) to move articles in a body from the receiving belt 5 associated with section A to the crossbelt 2, from the receiving belt 5 associated with section B to the receiving plate 4, and from the receiving plate 4 to the crossbelt 2. The receiving belts 5 each extend a short distance beyond the corresponding section of the row of storage belts, and are each provided at the end with a stop member 6, so that articles can collect at the ends of the receiving belts before being moved in a body therefrom.

The coded designations of the articles required for an order, in the quantity required, are fed into the system, a key is pressed to cause the selected clutches to operate, and the articles of the order are released onto the receiving belts 5. Four seconds' releasing time is allowed, at the end of which period the articles from section A are spread along the receiving belt 5 associated with that section, the majority being collected in front of the stop member 6, and the articles from section B being similarly positioned on the receiving belt 5 associated with section B. The articles from sections A and B are now moved onto the crossbelt 2 and the receiving plate 4 respectively. After a further four seconds the articles from section A are opposite the receiving plate 4 on the crossbelt, and the articles from section B are moved in a body onto the crossbelt 2 to join them. All articles of the order move off together, occupying a space on the crossbelt equivalent to four seconds travel thereon.

After an interval of six seconds from the release of the first articles of one order, when those articles are located some on the crossbelt 2 and others on the receiving plate 4, the receiving belts 5 being clear, the next order is released, this order having been keyed into the system during the preceding six seconds or, if this is impracticable, having been keyed in by a second operator from a second keyset. The articles of this order released from section A are moved onto the crossbelt six seconds after the corresponding articles of the preceding order, and there is thus a space equivalent to at least two seconds' travel between the first article of this order and the last article of the preceding order. At the same time the articles from section B are moved onto the receiving plate 4, and four seconds later, the release of a third order having begun in the meantime, onto the crossbelt 2, so that the articles of the second order move off together on the crossbelt occupying a space equivalent to four seconds' travel thereon, and separated by a space equivalent to two seconds' travel from the articles of the first order. Thus an order dispensing rate of one in six seconds is achieved while a releasing time of four seconds is allowed.

This is the maximum rate possible with the travel time and separation delay assumed in this description as every order must be allowed to occupy a space equivalent to four seconds' travel on the crossbelt, which it will in fact do if it contains articles from the extreme left and extreme right of a section of storage belts. Further two seconds' separation delay is necessary to separate individual orders. So with the embodiment illustrated in Fig. 5 it is necessary to wait for a period of four seconds after the release of an order before moving that order from the receiving belts 5, to allow the preceding order to get clear, and thus the order dispensing rate of one in six seconds cannot be bettered even if no order is to contain more than one article of the same kind.

The embodiment of the invention illustrated in Fig. 6 also allows articles to be delivered at the rate of one in six seconds, whether or not a plurality of articles from the same storage belt may be required for any one order.

The electrical control apparatus used in connection with this embodiment is such that each order is released in two parts or blocks, the release of articles from section B being started four seconds after the release of the first articles of the same order from section A. A releasing time of four seconds is allowed whether or not an order may comprise more than one article of the same kind.

In this embodiment both section A and section B are separated from the crossbelt 2 by a receiving belt 5. Those articles of an order which are stored in section A are released onto the receiving belt 5 associated with that section. Four seconds later these articles are moved onto the crossbelt, occupying a space equivalent to four seconds' travel thereon. At the same time section B commences to release its articles. After a further four seconds, when the articles from section A are opposite the receiving belt 5 associated with section B, the articles from the latter belt are moved bodily onto the crossbelt, the whole order occupying a space on the crossbelt not greater than four seconds' travel thereon.

The cycle for the next order follows six seconds later. That is, section A commences to release its articles two seconds after the articles of the preceding order have been moved from the receiving belt 5 onto the crossbelt 2. After four seconds section B commences to release the receiving belt 5 associated with that section having been cleared two seconds before, and so on.

Since the articles of each order from section A are moved onto the crossbelt six seconds after the articles of the preceding order, the last article of each order will always be separated by a space equivalent to at least two seconds' travel from the first article of the next. Thus each order occupies a space no greater than the equivalent of four seconds' travel on the crossbelt, and orders are separated by a space equivalent to two seconds' travel thereon. An order delivery rate of one in six seconds is consequently achieved. Since it is necessary to wait four seconds after the first release of the articles of an order before moving them onto the crossbelt, the order delivery rate is the same whether or not an order may comprise more than one article from the same storage belt, provided that no storage belt takes more than four seconds to release its articles.

Fig. 7 shows a front view of the embodiment of the invention illustrated in Fig. 6, three rows of storage belts 1, each with its associated crossbelt 2, being arranged one above the other. As described in connection with Fig. 6, orders may be spaced along the various crossbelts at intervals of six seconds. Not all articles of an order need be on the same crossbelt, as they may have come from different rows of storage belts and indeed, in the majority of cases, will have done so. However, if the various rows of storage belts work in unison, as described later, the portions of the crossbelts occupied by each order will be equal in length and vertically aligned. Once the orders are thus separated from each other, any known method may be used to bring all articles of an order together at the collecting point. The crossbelts, for example, may run at the same speed and slope to a common level, the level of the collecting point, the delivery section there being wide enough to cover the discharge ends of all crossbelts, which should be running side by side at this point.

Fig. 8 is a top view of an alternative arrangement of the embodiment shown in Fig. 6. Here the one crossbelt 2 is fed from storage belts 1 and receiving belts 5 arranged on either side of it. Such an arrangement provides additional economy of space. All storage belts of the various vertical levels, and all apparatus to move articles from receiving belt to cross belt, may be adapted in the manner described later to work in unison, so that the articles of each order will be separated on the crossbelts from the articles of other orders, and may be brought together as a separate group at the collecting point.

An article dispensing system capable of handling a very wide range of different kinds of articles may be built up from units each of which comprises one of the arrangements illustrated in Fig. 8. The position of the collecting point can be so chosen and the speed of the crossbelts so adjusted that all articles of each order, from whatever level of whatever unit they may have come, will reach the collecting point together.

Although in the foregoing description in connection with Figs. 4 to 8 each row of storage belts has been described as divided into two sections only, this is by no means a necessary limitation. Longer rows of storage belts, each divided into a greater number of sections, may be employed, the same order delivery rate being maintained by delaying the articles of an order released from the storage belts of subsequent sections until the articles of the same order released from the belts of earlier sections are opposite them.

The articles need not necessarily be stored on belts, nor need the members 2, which have been spoken of as crossbelts, necessarily be belts.

The assumptions made as to the speed of travel on the crossbelts, and the releasing time and separation delay allowed, should be treated as examples only. Each will depend in practice on the type and size of the articles being handled, and on the releasing speed of the storage devices used.

Figs. 9 to 15 illustrate various arrangements whereby articles may be moved in a body from receiving device to crossbelt, and also various types of receiving devices which may be employed.

Figure 9:
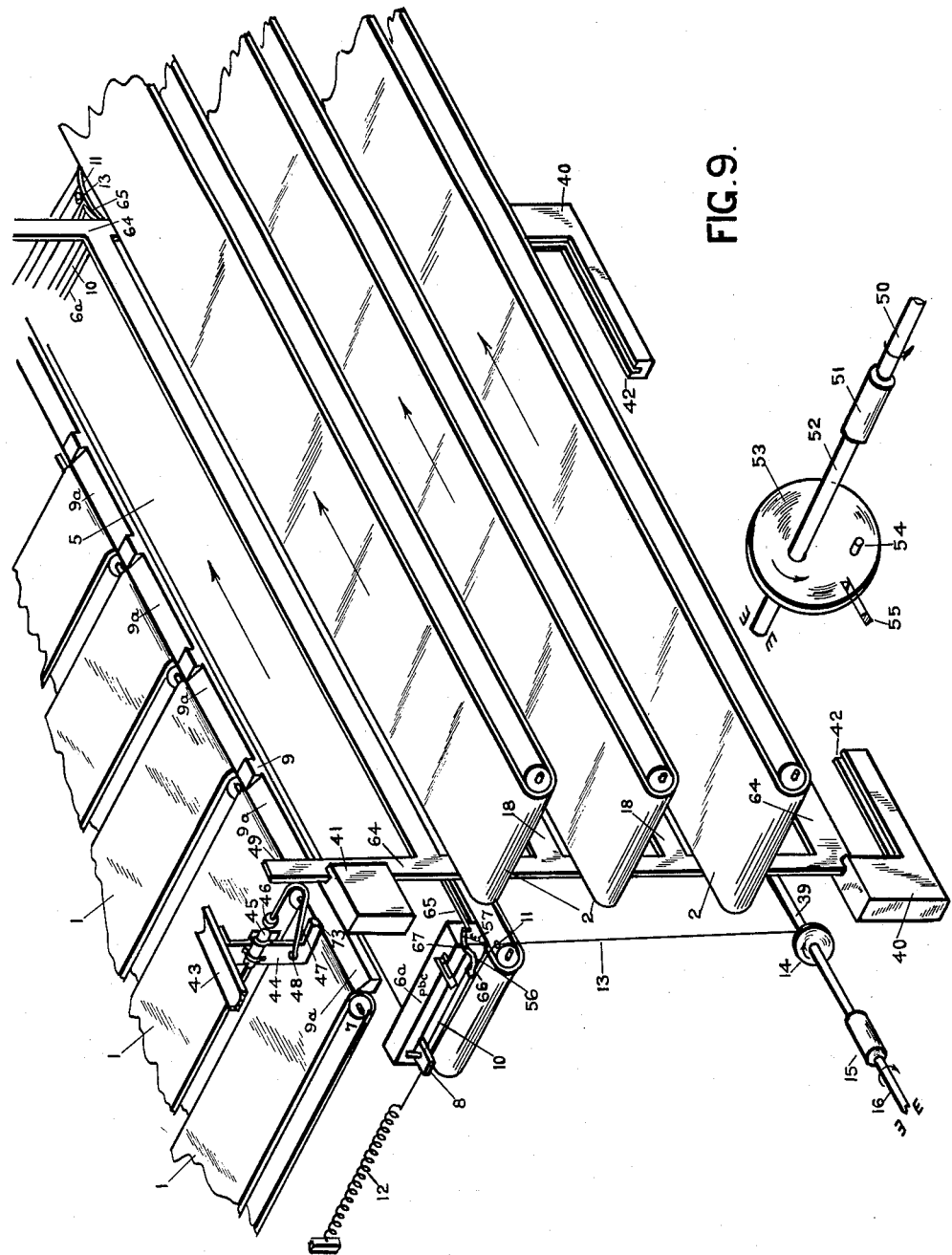

In the arrangement illustrated in Fig. 9 three crossbelts 2 are arranged one above the other. A section of storage belts 1 and a receiving belt 5 are associated with each crossbelt, and as explained before, articles are released from the storage belts onto the receiving belt and later moved in a batch onto the crossbelt. Only the section of storage belts and the receiving belt associated with the topmost crossbelt are shown, but it should be understood that similar arrangements are provided for the other crossbelts also.

A pusher bar, consisting of a horizontally disposed member 8 and a vertically disposed member 9, extends the whole length of the receiving belt 5, and in the unoperated position (the position illustrated), fits closely against the releasing ends of the storage belts 1. Cut away portions 9a at the top of the vertically disposed member 9 of the pusher bar allow articles to topple over that member from the storage belts 1 to the receiving belt 5. When all articles of an order stored in the section of storage belts illustrated have been released onto the receiving belt, the pusher bar is moved across the receiving belt and pushes these articles from it. A stop member 18, which is normally located between the receiving belt 5 and the crossbelt 2, is at the same time moved out of the way of the articles, to allow them to be pushed from the receiving belt onto the crossbelt.

At each end of the receiving belt a stop member 6a is positioned. The ends of the horizontally disposed member 8 of the pusher bar fit into grooves 10 in the stop members 6a, and are adapted to move laterally in these grooves across the receiving belt 5. To the ends of the horizontally disposed member 8 of the pusher bar are attached springs 12 to pull the pusher bar backwards towards the releasing ends of the storage belts 1, and wires 13 attached to member 8 are guided over pins or rollers 11 to pulleys 14 to pull the pusher bar forward across the receiving belt 5 when the pulleys are rotated. Each of the pulleys 14 (of which only one can be seen in the figure) is rigidly connected with a shaft 39 which is normally unoperated. An electromagnetic clutch 15, which may be of any known suitable type, is adapted on operation to connect the shaft 39 with a constantly rotating driving shaft 16 and thus to cause the pulleys 14 to rotate in the direction indicated by the arrow and pull the pusher bar forward across the receiving belt 5. When the pusher bar reaches the forward position it operates an electrical contact pbc and breaks the operating circuit of electromagnetic clutch 15. The springs 12 now attempt to return the pusher bar to the normal position, but for a short period it is held in the forward position by catches 56, as will be described below. Although the operation of only the topmost pusher bar is shown, all pusher bars of the various levels can be operated simultaneously and only one contact pbc is required.

At the same time as the clutch 15 is engaged and the pusher bar begins its forward movement the stop member 18 is moved out of the way of the articles. The stop members 18 for the various crossbelts are made in one unit which comprises a frame 64 and the stop members 18 themselves. This unit can move in the vertical direction in slideways 42 in supporting members 40 and 41, which hold the unit rigid as it moves. In the normal or unoperated condition (as illustrated) the stop members 18 are in the raised position, and are held in that position by catches positioned above the supporting member 41, and supported by the framework 43. Only one of these catches is illustrated, the other being similar in all respects. Each catch consists of a bar 47, one end of which is pivotally mounted at 48 on an extension 44 of the general framework 43, while the other end terminates in the armature 46 of an electromagnet 45. In the position illustrated extensions 49 of the frame 64 are resting on the bars 47 of the catches, which thus hold the frame 64 and stop members 18 in the raised position, being themselves supported by rests 73 on extensions 44. When the electromagnets 45 are energised they attract their armatures 46 and the catches are released as the bar 47 is drawn generally around its pivot 48 in the direction of the energised magnet 45. The frame 64 and stop members 18 drop under the influence of gravity, being guided by the slideways 42 in the supporting members 40 and 41, until arrested by the horizontal portions of the supporting members 40. In this position the stop members 18 are out of the way of articles being pushed from the receiving belts 5 to the crossbelts 2, while the bottom of frame 64 is just clear of the eccentrically driven wheel 53 positioned below it.

The eccentrically driven wheel 53 is rigidly connected with a normally unoperated shaft 52. An electromagnetic clutch 51 is adapted on operation to connect shaft 52 with a constantly rotating shaft 50, and thus to cause wheel 53 to rotate in the direction indicated by the arrow. A lug 54 on wheel 53 is so positioned that it breaks an electrical contact 55 when the wheel 53 has almost completed one revolution, and thus interrupts the operating circuit for clutch 51. The eccentric wheel 53 however continues to turn under the influence of gravity until it has completed the revolution and returned to the position illustrated, the lug 54 meanwhile clearing the contact 55, which closes again.

As the wheel 53 makes this revolution its circumference makes contact with the bottom of frame 64, and the wheel raises this frame and the stop members 18 to the normal position again. The extensions 49 of frame 64 ride over the bars 47 of the catches until they are clear of them, when the bars fall back under the influence of gravity (or under spring tension) so that the frame 64 and stop members 18 are held in the raised position. Thus as the wheel 53 completes the second part of its revolution it leaves the frame 64 behind, in the raised position.

As mentioned before, when the pusher bar reaches the forward position it is held there for a short period, against the springs 12, by the catches 56. These catches are each pivoted at 67 to the forward end of one of the stop members 6a, and tend to be held in a horizontal position by springs 57. However, when frame 64 and stop members 18 are in the raised position, extensions 65 on the frame 64 force the catches 56 into the position illustrated and hold them there. When frame 64 drops the catches 56 assume the horizontal position, and as the horizontally disposed member 8 of the pusher bar comes forward it rides over suitably shaped portions 66 of catches 56, forcing these portions down as it does so. As soon as the member 8 is clear of the shaped portions 66, the springs 57 snap the catches 56 into the horizontal position again, where they remain holding the member 8 in the forward position until forced into the illustrated position by the extensions 65 as frame 64 rises, whereupon the pusher bar is freed and drawn back into the normal position by springs 12.

The operation of the whole arrangement, then, proceeds as follows. When articles are to be moved in a body from the receiving belt 5 to the crossbelt 2, a contact is closed which simultaneously energises the electromagnets 45 and operates the clutch 15. The frame 64 and stop members 18 thereupon drop, clearing the way for the articles, while the pulleys 14 wind up the wires 13 and pull the pusher bar across the receiving belt 5. The pusher bar pushes the articles in front of it onto the crossbelt 2. When the pusher bar is fully forward, it is held there by the catches 56, which have been freed by the lowering of frame 64. The pusher bar also operates a contact pbc which released clutch 15, de-energizes magnets 45, and operates clutch 51. Ecentric wheel 53 makes one revolution, as explained before, and in doing so raises frame 64 and stop members 18 to the normal position. As frame 64 rises it releases catches 56, so that the pusher bar also returns to its normal position. It should be understood that all pusher bars, for all vertical levels, move together, just as all stop members 18 move together. Each pusher bar may do this and be operated by a pulley 14 connected with the same shaft 39. In this case the functions mentioned above for the contact operated by the pusher bar in the forward position are not performed until all pusher bars have reached that position.

The electrical operations associated with the arrangement just described are explained fully later on in connection with Figs. 16 to 18.

Figure 10:
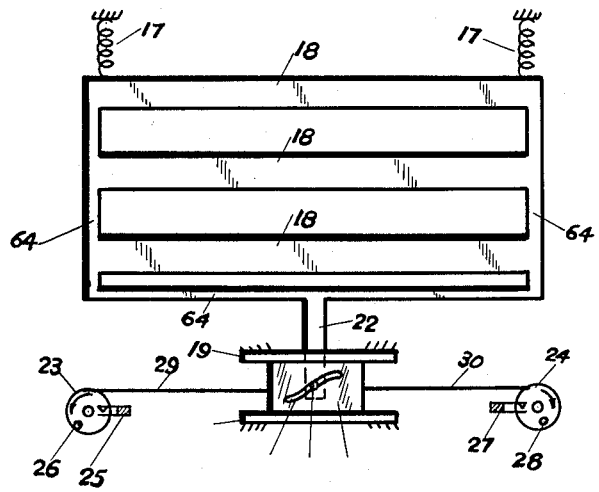

Fig. 10 illustrates an alternative method of raising and lowering frame 64 and stop members 18. In this arrangement frame 64 is fastened at the top at each end to springs 17, which may be coil springs as illustrated, or leaf springs to give greater rigidity. An extension 22 at the bottom of frame 64 has secured to it a rod 21, with a comparatively large head, adapted to slide in groove 20 in slide member 68. Slide member 68 can move laterally in slideway 19, the latter being itself rigidly fixed in the general framework. Groove 20 is so designed that when slide member 68 is at the extreme left of its possible travel, frame 64 and stop members 18 are in the raised position, and are held in that position by a horizontal portion at the extreme right of groove 20. When slide member 68 is at the extreme right of its possible travel, frame 64 and stop members 18 are in the lowered position, and are held there by a horizontal portion at the extreme left of groove 20.

Pulley 23, which is associated with an electromagnetic clutch as explained above for pulley 14 (Fig. 9) is adapted on the operation of its associated clutch to draw slide member 68 to the left, and thus to raise frame 64 and stop members 18. Pulley 24 is similarly adapted to lower frame 64 and stop members 18, pulleys 23 and 24 being fastened to slide member 68 by wires 29 and 30 respectively. Lug 28 on pulley 24 is so positioned that it closes contact 27 when slide member 68 has been drawn to the right and frame 64 has thus been lowered. The closing of contact 27 breaks the operating circuit for the clutch associated with pulley 24, frame 64 thus remaining in the lowered position. Lug 26 on pulley 23 is similarly adapted to close the contact 25 and thus break the operating circuit for the clutch associated with pulley 23, when the frame 64 is in the raised position.

Figure 12:
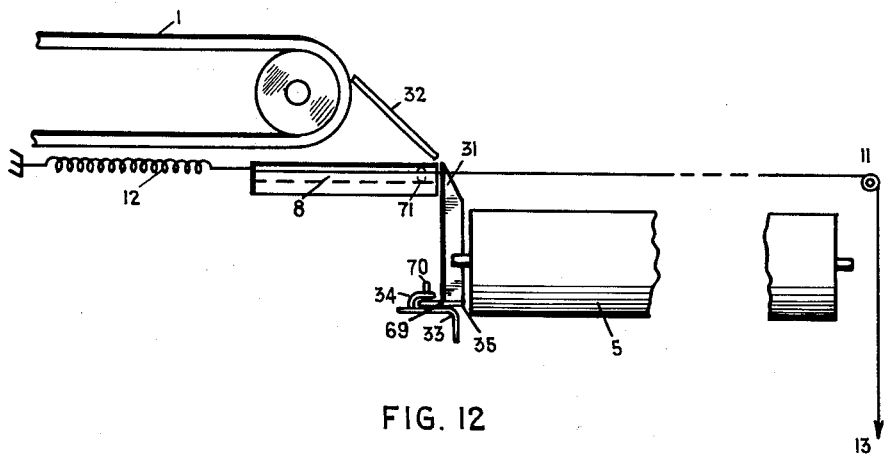
Figure 13:
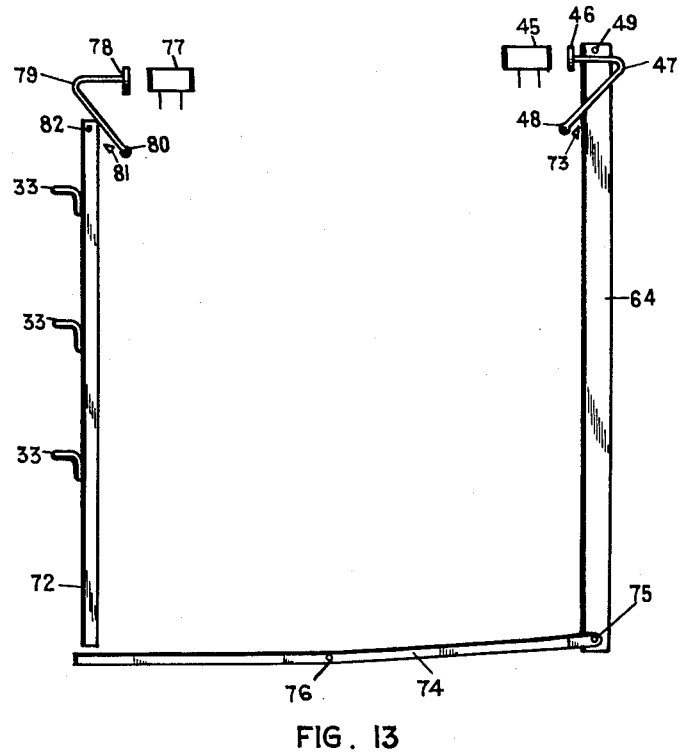

The pusher bar arrangement described in connection with Fig. 9 entails a comparatively large drop from the storage belts over member 9 of the pusher bar onto the receiving belt below. Figs. 11, 12 and 13 illustrate an arrangement in which a guide is provided over which articles slide to the receiving belt. In all cases cushions (e. g. of felt) are preferably provided under the receiving belt to obviate risk of damage to the articles. Fig. 11 is a general view of the arrangement associated with this type of pusher bar, and shows three vertically adjacent crossbelts 2 and the storage belts 1 and receiving belt 5 associated with the topmost of these.

In this arrangement a panel 32 slopes from the releasing ends of the storage belts 1 to the rear end of the receiving belt 5, and acts as a guide down which articles released from the storage belts slide, or over which they topple, to the receiving belt. Contact devices 38 are situated on this panel, one being associated with each storage belt 1, and are so positioned that each device is operated whenever an article is released from the associated storage belt. The functions of these article-operated contacts will be referred to in more detail in connection with Figs. 16 to 18.

The pusher bar itself in this embodiment comprises a horizontally disposed member 8, the ends of which are adapted to slide in grooves 10 in the stop members 6a, as explained in connection with Fig. 9, and a vertically disposed member 31, positioned at the forward end of member 8 and movable in the vertical plane. In the unoperated position of the pusher bar, the position illustrated, the vertically disposed member 31 lies below the horizontally disposed member 8, and this is clear of articles sliding over the panel 32 from the storage belts to the receiving belt.

When the pusher bar is to be operated the vertically disposed member 31 is first raised (this operation is explained in connection with Figs. 12 and 13), while at the same time the frame with stop members 18 is lowered. The operation then proceeds in the manner described above in connection with Fig. 9, clutch 15 being engaged when member 31 (Fig. 11) reaches the raised position. The details of the apparatus involved in this operation, which is shown in Fig. 9 are not repeated in Fig. 11. When the pusher bar has returned to the normal or unoperated position the vertically disposed member 31 drops to its normal position below the horizontally disposed member 8, and the articles of the next order can be released.

Fig. 12 is a side view showing further details of the type of pusher bar described in connection with Fig. 11. It will be seen that the vertically disposed member 31 of the pusher bar is cut away at the top and acts as an extension of panel 32, forming whilst in its lowered position in conjunction with that panel a slideway for artciles released from the storage belts 1 to the receiving belt 5. A rearward extension at the base of vertically disposed member 31 rests beneath several lugs 34 spaced at intervals along the top of an angle iron 33, which extends beyond member 31 at either end. The base of member 31 rests on this angle iron. There is a separate angle iron 33 for each pusher bar, and these angle irons may form one unit (being joined in Fig. 11) and be raised and lowered together for example in either of the ways described in Figs. 9 and 10 for frame 64, or in the manner described later in connection with Fig. 13. When angle iron 33 is raised each of the lugs 34 fits into a recess at the bottom of the horizontally disposed member 8 of the pusher bar, while pins 70 on the rearward extension of member 31 fit into holes 71 in member 8. When the horizontally disposed member 8 is now drawn forward across receiving belt 5, the vertically disposed member 31 is pushed in front of it, the base 35 of this member sliding on the belt 5. The grooves at the bottom of member 8 allow that member to slide out over the lugs 34. When the pusher bar returns again to the rear of receiving belt 5, angle iron 33, and with it vertically disposed member 31, is lowered again to the unoperated position, so that member 31 is clear of articles toppling from the storage belts to the receiving belt. The vertically disposed member of the pusher bar may of course be positioned above the level of the storage belts when unoperated, and on operation lowered to meet the horizontally disposed member and travel with it across the receiving belt.

Fig. 13 indicates in a simplified form one method of raising the slide members 12, to which are attached the angle irons 33. In this arrangement the members 72 work in co-operation with frame 64, levers 74 which are pivotally attached to the bottom of frame 64 and pivoted at 76 bearing underneath members 72 when frame 64 is in the raised position, being held there by bar 47 as explained above in connection with Fig. 9, while members 72 are in the lowered position. When magnet 45 is operated and frame 64 drops, lever 74 raises members 72, and with them the angle irons 33. Projections 82 on the side members 72 ride over bars 79, which form part of catches similar to those used to control frame 64, until they clear the bars which then fall back and hold members 72 in the raised position, bearing against rests 81 as they do so. The subsequent raising of frame 64 leaves members 72 in the raised position, until magnet 77 is energized, when it attracts its armature 78 and pulls bar 79, which is pivoted at 80, clear of projections 82. Members 72 then drop once more to the unoperated position. The downward movement of members 72 is made independent of the raising of frame 64 as it is desirable, to prevent articles being pushed back from the crossbelt to the receiving belt, that frame 64 should be in the raised position before the pusher bar begins its backward journey, and consequently before members 72 are lowered.

Figure 14:
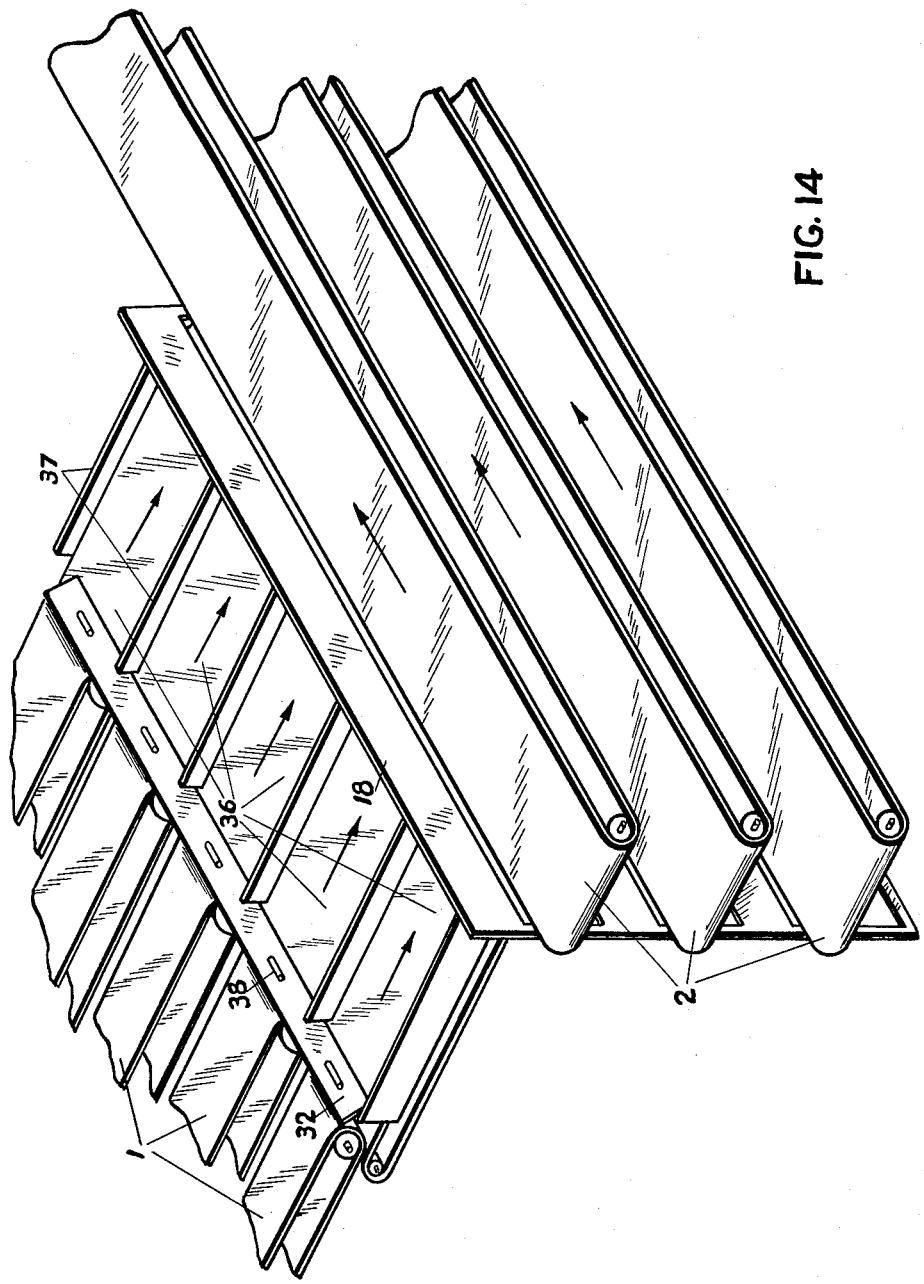

Fig. 14 illustrates another arrangement whereby articles may be transferred from receiving member to crossbelt. The receiving member in this arrangement comprises a plurality of continuously moving belts 36, one for each storage belt, which are so positioned that they receive the articles released from the storage belts over the panel 32 and move them in the direction indicated by the arrows until they come up against stop member 18. The belts 36 are separated from each other by guides 37, which ensure that no article will become caught between two belts 36.

When all the articles of an order stored on the storage belts of the section illustrated have been released, stop member 18 is lowered as explained before, and the movement of belts 36 transfers the articles onto crossbelt 2. Stop member 18 is then raised again, and the articles of the next order can be released. It must be understood that instead of a plurality of belts 36, one wide belt could be used to achieve the same effect.

The fact that the belts 36 are continuously moving away from the releasing ends of the storage belts 1 has two advantages. As well as effecting the transfer of articles from the receiving belt to the crossbelt when stop member 18 is lowered, the movement of the receiving belt has the effect of moving each article away from the releasing end of the storage belt from which it came immediately on its release. Accordingly a quantity of articles can be released from the same storage belt without any fear that one may topple onto and break or crush the one released before it.

Fig. 15 illustrates yet another arrangement for the transfer of articles from receiving member to crossbelt. In this embodiment of the invention the articles released from the storage belts 1 slide over the panel 32 onto a receiving plate 4. When all the articles of an order stored on the storage belts of the section illustrated have been released, the receiving plate 4 is tilted, stop member 18 is lowered, and the articles slide under the force of gravity from the receiving plate to the crossbelt. The forward end of the receiving plate is rigidly attached at points 61 to a shaft 59 which is rotatably mounted in brackets 60. Wires 62, attached to each end of the rear of the receiving plate, are raised, when operation of the receiving plate is required, by pulleys operated by an electromagnetic clutch in the manner described above for clutch 15 and rollers 14 (Fig. 9). A contact 63 is operated by the receiving plate when tilted to the fullest extent required, and releases the pulleys which are raising the plate. The plate then returns under the influence of gravity to its normal position, and the articles of the next order can be released.

The arrangements described above for the transfer of articles from receiving member to crossbelt are not intended to be exhaustive. Other arrangements for achieving this result may be used without departing from the spirit of the invention, the arrangements described being given by way of example only.

It should be understood that the invention is applicable to all systems in which articles are stored in or on storage devices which are arranged in rows and adapted to release or discharge articles onto conveyors common to the rows. Neither the storage devices nor the common conveyors need necessarily be belts. For example, the common conveyors may be roller conveyors, and the storage devices may be merely chutes displaced more or less vertically and adapted to release the bottom articles on the operation of associated releasing devices. Again, the storage devices may be intermediate storage devices into which articles are brought in batches, the articles of one order being temporarily held in a plurality of such intermediate storage devices and released together to a receiving device, from which they are transferred in the manner described above to a common conveyor.

In cases where greater separation delay is required, an additional common conveyor may be provided, with transfer means to move each alternate order from the first common conveyor to the second. This arrangement is similar to that shown under B in Fig. 5, but the member 4 is replaced by a conveyor belt similar to 2. To allow articles on the first conveyor free passage along it, the guide members for the second transfer device are positioned above the conveyor. Reference to Fig. 11 will show that by positioning the guide members 6a above belt 5, and rigidly suspending the pusher bar apparatus at either end from a member similar to 8 adapted to move in the grooves thereof, free passage would be given to articles along belt 5 should that be required.

Figs. 16, 17 and 18 show electrical circuits which may be used to carry out various embodiments of the invention.

The circuit arrangement shown in Fig. 16 may be used in conjunction with a system as illustrated in Fig. 4, in which one article only is to be released from each storage device of section A, and in which the arrangement shown in Fig. 9 is used to move articles released from section B in a body onto the crossbelt.

An operator selects the articles required for an order by keying up the coded designations thereof on keys K at an Operator's Position OP. A Selecting Relay Group SRG (details of which are not shown, but which may for example be of the type described in United States Patent No. 2,535,461) transmits these selections to relays 1RG—4RG by applying earth through one of the contacts b1—b4. (These contacts are similar to contacts 0fd to 9fd shown in Fig. 2A of United States Patent No. 2,535,461.) The relays 1RG—4RG are individually associated with the various releasing devices (four only are shown), and are each selectively operated on the selection of the corresponding releasing device. When a complete order has been selected the operator presses the key KR, and the selections stored in the relay RG are transmitted to corresponding relays CR. These relays operate the selected releasing devices, and may also operate pricing mechanisms, as described for example in United States Patent No. 2,535,461.

All selected releasing devices begin to operate simultaneously on the operation of key KR. Those of section A (Fig. 4) release only one article each, while those of section B may each release a plurality of articles, in a manner described later in connection with Fig. 18, and in this embodiment are allowed four seconds releasing time. When each releasing device has operated, and the required number of articles released, the corresponding article-operated trip contact TC is operated to release the CR relay. As soon as all CR relays have released the relay C, which remains operated as long as any CR relay is energized, is released.

The release of relay C and the operation of slow-operating relay D, which has a delay of four seconds, combine to initiate the operation of the pusher-bar mechanism (Fig. 9). When the pusher-bar reaches the fully forward position it operates an electrical contact *pbc*, as described before, which restores the electrical and mechanical arrangements to their normal position.

As mentioned above only four relays are shown in the group 1RG—4RG and four in the group 1CR—4CR, but it should be understood that one relay in each of these groups is provided for each releasing device.

The operation of the circuit arrangement shown in Fig. 16 will now be described in detail, it being assumed that an order is to be selected requiring articles from the releasing devices associated with relay 1CR and relay 3CR, these releasing devices being included in sections A and B respectively (Fig. 4), one article only being required from the releasing device associated with relay 1CR, and a plurality (requiring four seconds' releasing time) from the releasing device associated with relay 3CR.

When the operator keys up the appropriate coded designation to select the releasing device associated with relay 1CR, the selecting relay group operates, and contact $b1$ closes and energises relay 1RG. Relay 1RG operates its contacts $1rg1$ to $1rg3$. Contact $1rg1$ closes a holding circuit for relay 1RG from earth over normally closed contact $t2$, contact $1rg1$ and relay 1RG to battery and earth.

Contact $1rg2$ prepares a circuit for relay 1CR from earth over contact $s2$, contact $1rg2$ and relay 1CR to battery and earth. As contact $s2$ is still open, however, relay 1CR does not operate at this stage. Contact $1rg3$, which is a make before break contact, closes momentarily to operate slow release relay R, and then opens to release this relay. Before it is de-energised, however, relay R released the Selecting Relay Group SRG (as described for relay RS in U. S. Patent No. 2,536,461) contact $b1$ opens, and the Selecting Relay Group is ready to receive another selection.

The operator then keys up the appropriate coded designation to select the releasing device associated with relay 3CR. Relay 3RG is operated and held as described above for relay 1RG, a circuit is prepared for relay 3CR over contact $s2$, and relay R operates to release the Selecting Relay Group.

The whole order has now been selected and the operator presses the key KR. While pressed this key energises the relay A, which closes its contacts $a1$ and $a2$. Contact $a1$ closes a holding circuit for relay A from earth over normally closed contact $t1$ and contact $a1$ through relay A to battery and earth. Contacts $a2$ energises relay S from earth over contact $a2$ and contact $x1$ through relay S to battery and earth.

Relay S closes its contacts $s1$ and $s2$. Contact $s1$ prepares a circuit for relay T over normally open contact $c1$. Contact $s2$ completes the circuits already prepared to relays 1CR and 3CR and energises those relays. Relay 1CR closes its contacts $1cr1$ to $1cr3$. Contact $1cr1$ closes a holding circuit for relay 1CR over article operated trip contact 1TC. Contact $1cr2$ closes an energising circuit for the corresponding clutch magnet (CM in Fig. 19) to drive the storage belt controlled thereby. Contact $1cr3$ closes an operating circuit for the relay C. The contacts of relay 3CR perform the same functions with respect to that relay. It will be seen that relay C is operated as soon as any relay 1CR—4CR is energised.

Relay C closes its contacts $c1$ to $c3$. Contact $c1$ completes the circuit already prepared for relay T, and that relay opens its break contacts $t1$ and $t2$. Contact $t1$ breaks the holding circuit for relay S, and that relay releases and opens its contacts $s1$ and $s2$. Contact $t2$ breaks the holding circuits for relays 1RG and 3RG which release their contacts $1rg1$ to $1rg3$ and $3rg1$ to $3rg3$ respectively. As contact $s2$ is now open the holding circuit for relay T is now broken, and contacts $t1$ and $t2$ release again.

At this stage another order can be keyed into the system by the keys K, although the first order may not have finished releasing. However, if the key KR is pressed before the first order is released and relay C de-energised, relay A will operate and be held, but the closing of contact $a2$ will not yet be effective to operate relay S, since contact $x1$ is open (as will be described below).

Returning now to the functions of relay C. Contact $c1$, as described, releases the earlier parts of the circuit (except for the CR relays) and enables another order to be selected. Contact $c2$ closes a circuit for the relay P, which closes its contacts $p1$ to $p3$. Contact $c3$ breaks and the operating circuit for magnets 45 is thus disabled during the period that the relay C is energised.

Contact $p1$ closes a holding circuit for relay P over normally closed contact $w2$. Contact $p2$ closes a circuit through relay D. This relay is slow-operating, having a delay of four seconds, and accordingly does not operate to close its contact $d1$ immediately. Contact $p3$ closes a circuit to energise relay X, which opens its contact $x1$ and thus, as mentioned above, prohibits the operation of relay S if key KR is pressed. Relay X has a slight releasing delay, the purpose of which will be explained below.

As soon as the selected releasing devices begin to release the articles required for an order, then relay C operates and a circuit is completed through relay D. After four seconds relay D operates and closes its contact $d1$. If relay C has by now been de-energized, that is if all releasing devices have finished releasing, a circuit is closed from earth over contact $c3$, contact $d1$, and magnets 45 and magnet M15 in parallel, to battery. Magnets 45 release the frame 64 and stop members 18 (Fig. 9) and these are lowered. Magnet M15 operates clutch 15 (Fig. 9) to connect shaft 39 to constantly rotating shaft 16, and pulley 14 is operated to pull the pusher bar across the receiving belt 5, and thus to move the articles released from section B in a body onto the crossbelt 2.

When the pusher bar reaches its fully forward position it operates an electrical contact *pbc*. Reference to Fig. 16 will show that this contact when closed energises relay W. Relay W closes its contact $w1$ and opens its contact $w2$. Contact $w2$ breaks the holding circuit for relay P, which releases its contacts $p1$ to $p3$. Contact $p2$ breaks the operating circuit for relay D, which releases its contact $d1$. Contact $p3$ breaks the operating circuit for relay X, which after a slight delay closes its contact $x1$. If key KR is now pressed for the next order, relay S will be operated and the cycle described above will begin again. If key KR has already been pressed, relay S will operate immediately contact $x1$ closes. As the circuit for relay X is broken with the pusher bar in its forward position (when contact *pbc* is operated), and as the release of articles begins again as soon as relay S operates, which may be as soon as contact $x1$ closes, relay X is given a slight time delay, sufficient to ensure that no article will be released from section B until the pusher bar has returned to the normal position.

Contact $w1$, which is closed when contact *pbc* is operated by the pusher bar in its forward position, closes an energising circuit for relay Z. Relay Z closes its contacts $z1$ and $z2$. Contact $z2$ closes a holding circuit for relay Z from earth over normally closed contact 55 (Fig. 9), contact $z2$ and relay Z to battery and earth. Contact $z1$ closes an energising circuit for magnet M51, the operating magnet for clutch 51 (Fig. 9).

Clutch 51 operates and connects shaft 52 to constantly rotating shaft 59. Eccentric wheel 53 revolves and raises frame 64 with stop members 18, as described before. Extensions 65 on frame 64 release the pusher bar, which is returned to the normal position by springs 12, and lug 54, as wheel 53 continues to rotate, opens contact 55 and thus de-energizes relay Z, which opens its contacts $z1$ and $z2$.

As soon as the pusher bar has returned the release of the next order may be begun, and the releasing devices required for a third order may be selected by the operator.

Fig. 17 shows a circuit arrangement which may be used in connection with the arrangement illustrated in Fig. 5 or Fig. 6, in which there is associated with each of sections A and B a pusher bar arrangement as illustrated in Fig. 9. In this arrangement a plurality of articles may be released from the storage devices of both sections, but an electrical delay is provided so that articles stored in section B do not commence to be released until four seconds after the articles of the same order stored in section A.

The articles of each order are selected in the manner described before in connection with Fig. 16, and the relays 1RG—4RG and relays A, S, T and C operate in a manner similar to the one there described. It will be assumed that an order requiring articles from the storage devices associated with relays 1CR and 3CR has been keyed into the system, and that the relays 1RG and 3RG have been operated and held. The releasing devices associated with relays 1RG and 3RG are included in sections B and A respectively (Fig. 6).

When the key KR is pressed on the completion of the order, relay S operates as described before and a circuit is completed from earth over contact *s*2 and contact 3*rg*2 through relay 3CR to battery and earth. Relay 3CR is energised, the associated releasing device operates, and relay C is energised to operate relay T and release the earlier part of the circuit. After four seconds, or when all articles have been released from section A if that takes longer than four seconds, the pusher-bar associated with section A operates and moves the articles released from that section onto the crossbelt. The circuits controlling this are identical with those described in connection with Fig. 16 (the arrow at contact *xa*2 indicates the connection to relays W and Z and magnets 45, M15 and M51), except that the additional contact *xa*2 is provided, which when open prohibits the operation of the pusher-bar, as will be explained later in more detail.

Additional relays 1RD—4RD are provided, one for each releasing device of section B, and also relays M and N which operate to delay the release of articles from section B for four seconds. When key KR is pressed and relay S operates, a circuit is completed for relay 1RD from earth over contact *s*2, contact 1*rg*2 and relay 1RD to battery and earth, and for relay M from earth over contact *s*2, make before break contact *m*1 and relay M to battery and earth.

Relay 1RD closes its contacts 1*rd*1 and 1*rd*2. Over contact 1*rd*1 a holding circuit is closed for relay 1RD over contact *ca*1 of relay CA. Contact 1*rd*2 prepares a circuit for relay 1CR from earth over contact *n*2 (still open), contact *xa*1 (normally closed), contact 1*rd*2 and relay 1CR to battery and earth.

Relay M operates its contacts *m*1 and *m*2. Contact *m*1 first closes a holding circuit for relay M over contact *n*1, and then breaks the operating circuit for relay M. Contact *m*2 closes an operating circuit for relay N. This relay, however, is a slow operating relay with a time delay of four seconds, and does not operate immediately. After four seconds it operates to open its contact *n*1 and close contact *n*2. Contact *n*1 breaks the holding circuit for relay M. Contact *n*2 completes the circuit already prepared for relay 1CR, and that relay is energised and closes its contacts 1*cr*1 to 1*cr*3.

Contact 1*cr*1 completes a holding circuit for relay 1CR over the article-operated trip contact 1TC. Contact 1*cr*2 closes the operating circuit for the selected releasing device. Contact 1*cr*3 completes an operating circuit for relay CA, which operates its contacts *ca*1 and *ca*2. Contact *ca*1 opens and breaks the holding circuit for relay 1RD. Contact *ca*2 completes an operating circuit for relay PA, which closes its contacts *pa*1 and *pa*2. Additional contacts (not shown) of relay CA and PA corresponding to contacts *c*3, *p*1 and *p*2 are also operated to energise the operating circuits for the pusher-bar associated with section B. These circuits, which are not shown here, are identical with those described above in connection with Fig. 16 and include the relays D, W and Z and the magnets M15, 45 and M51.

Contacts *pa*1 and *pa*2, together with contacts *xa*1 and *xa*2, provide automatic control means to ensure that orders follow one another in proper sequence and at proper intervals. Their function will be more clearly understood from a consideration of two consecutive orders, order 1 and order 2, both of which require articles from both section A and section B. When the key KR is pressed for order 1, the selected releasing devices of section A begin to release their articles, and the RD relays associated with the selected releasing devices of section B are energised and held. Normally the releasing devices of section A will have completed their operation within four seconds, and after that time the pusher-bar will operate. However, if one of them takes more than four seconds, contact *c*3, as explained before, ensures that the pusher-bar waits until all articles are released.

Four seconds after the pressing of key KR, the selected releasing devices of section B begin to operate. They also are allowed four seconds releasing time, and a contact of the CA relay corresponding to contact *c*3 prevents the pusher-bar from operating too soon in case any releasing device takes more than the time allowed.

Order 2 can be keyed into the system as soon as key KR has been pressed for order 1. As explained before, however, the pressing of key KR for order 2 will have no effect unless contact *x*1 has closed again, that is unless the pusher-bar for section A has returned to the normal position. This will be at least six seconds (four seconds provided by relay D and two seconds operating time for the pusher-bar) after the pressing of key KR for order 1, and by this time the releasing devices of section B selected for order 1 will be operating, since relay N delays them for only four seconds. Thus as soon as the pressing of key KR becomes effective for order 2, section A commences to release, and the RD relays associated with the selected releasing devices of section B are energised and held. Since relay CA is energised at this time for order 1, the holding circuits for the RD relays go to earth not over contact *ca*1, but over contact *pa*1, which is closed (because relay PA is energised over contact *ca*2) whenever contact *ca*1 is open. When relay CA is released, contact *ca*1 closes and the holding circuits for the RD relays selected for order 2 are transferred to earth over that contact.

It may happen that one of the releasing devices of section B selected for order 1 takes more than the allotted four seconds to release its articles, and relay N may operate for order 2 before all articles of order 1 have been released, or before the pusher-bar for section B has returned to its normal position. However, relay XA is operated as long as relay PA is operated, that is while articles are being released and until the pusher-bar reaches the forward position, and for a further short interval (since it is a slow-release relay), until the pusher-bar has returned to the normal position, and while relay XA is operated contact *xa*1 is open to prevent the operation of relay N being effective to actuate the CR relays selected for order 2. If relay N does operate with relay XA operated, it is held over its own contact *n*3 and contact *xa*3 until relay XA is de-energised, and as it has a short release delay it remains operated after contact *xa*1 has closed, and thus causes the relay 1CR—4CR selected for order 2 to be actuated at the correct time.

Contact *xa*2, a further contact of relay XA, is incorporated in the operating circuit for the pusher-bar associated with section A, as mentioned before, and serves to co-ordinate the pusher-bars of the two sections. The pusher-bar of section A is prohibited by this contact from operating for order 2 until the pusher-bar of section B has returned to the normal position after operating for order 1. If no delays occur this contact will not prevent an order delivery rate of one every six seconds being maintained. The pusher-bar of section B will return to the normal position ten seconds after the key KR is pressed for order 1, which is the time when the pusher-bar of section A should begin to operate for order 2. If any delay does occur, however, in either section A or section B, contact $xa2$ brings the pusher-bars into co-ordination again (both normal) before allowing another cycle to commence.

Fig. 18 illustrates a circuit arrangement which allows a plurality of articles to be dispensed from one releasing device when the coded designation of that releasing device has been keyed only once into the system. The arrangement illustrated effects the release of four articles, but may be modified, as will be explained later, to effect the release of other numbers of articles.

A switch SW, which operates in the same manner as the uniselector switches commonly used in the automatic telephone art, has associated with it a stepping magnet SM, the relationship between the two being such that the wiper of switch SW is made ready to step when magnet SM is energised, and makes one step when that magnet is de-energised. The relay CR in Fig. 18 may be any of the relays 1CR—4CR in Fig. 16 or 17, and is actuated on the closing of contacts $rg2$ and $s2$ in the manner explained in connection with Fig. 16. An additional relay F is provided to control the operation of the stepping magnet SM.

When contacts $rg2$ and $s2$ are closed, relay CR is operated and closes its contacts $cr1$ and $cr2$. Contact $cr1$ closes a holding circuit for relay CR over the article operated trip contact TC. Contact $cr2$ closes an operating circuit for relay F, which operates its contacts $f1$ and $f2$. Contact $f2$ closes an energising circuit for stepping magnet SM, and the wiper of switch SW is prepared to make one step.

The relay CR, as explained before, operates the associated releasing device. When an article is released it opens the contact TC and breaks the holding circuit for relay CR, which released its contacts $cr1$ and $cr2$. The opening of contact $cr2$ breaks the circuit for relay F, which releases its contacts. The stepping magnet SM is de-energised, and the wiper of switch SW makes one step. The wiper is now earthed, and relay CR is energised again from earth over the wiper of switch SW, contact $f1$ and relay CR to battery and earth. Relay F is again actuated, and the operation of the circuit is repeated. When the wiper has made four steps, that is when four articles have been released, it reaches a contact position which is not earthed, the CR relay remains de-energised, and no further articles are released.

It will be apparent that the number of articles to be released can be varied by altering the wiring of the switch SW. If every second contact position is earthed, two articles will be released each time the appropriate coded designation is keyed into the system, while if the contact positions are earthed in groups of two, three articles will be released for each selection.

If this arrangement is employed, up to six of any kind of article can be conveniently released by storing articles of that kind in three storage devices, one adapted to release four for the one selection, another two, and another one. No special arrangement, of course, is necessary in the last case. Each storage device must be given a separate coded designation.

It should be understood that the circuit arrangements given above are intended only as examples of ways in which the invention can be carried into effect, and that other circuit arrangements could equally well be used without departing from the spirit of the invention.

I claim:

1. In a system for dispensing articles of varied character: a plurality of storage and releasing devices; a receiving device mounted adjacent the releasing ends of a number less than the total number of said storage and releasing devices and adapted to receive a batch of articles selectively released from the adjacent storage and releasing devices; common conveying means mounted adjacent said receiving device and the releasing ends of the remainder of said storage and releasing devices for receiving articles released from said remainder of said storage and releasing devices and from said receiving device; and control means connected to said receiving device operable after the release of said batch of articles to transfer as a group to said common conveying means said articles held on said receiving device.

2. In a system for dispensing articles of varied character: a plurality of storage and releasing devices; a receiving device mounted adjacent the releasing ends of a number less than the total number of said storage and releasing devices and adapted to receive a batch of articles selectively released from the adjacent storage and releasing devices, said receiving device comprising an article-receiving member movable past the releasing ends of said adjacent storage and releasing devices and a stop member positioned across said movable member beyond the last of said adjacent storage and releasing devices in the direction of movement of said movable member to retain said released articles; common conveying means mounted adjacent said receiving device and the releasing ends of the remainder of said storage and releasing devices for receiving articles released from said remainder of said storage and releasing devices and from said receiving device; and control means connected with said receiving device operable after the release of said batch of articles from storage to transfer said articles as a group to said common conveying means.

3. In a system for dispensing articles of varied character: a plurality of storage and releasing devices; a receiving device including an article-receiving member mounted adjacent the releasing ends of a number less than the total number of said storage and releasing devices and adapted to receive a batch of articles selectively released from the adjacent storage and releasing devices, said article-receiving member being tiltable away from said adjacent storage and releasing devices; common conveying means mounted adjacent said receiving device and the releasing ends of the remainder of said storage and releasing devices for receiving articles released from said remainder of said storage and releasing devices and from said receiving device; and control means operable after the release of said batch of articles to tilt said article-receiving member for the transfer of said batch of articles as a group to said common conveying means.

4. In a system for dispensing articles of varied character: a plurality of storage and releasing devices; a receiving device mounted adjacent the releasing ends of a number less than the total number of said storage and releasing devices and adapted to receive a batch of articles selectively released from the adjacent storage and releasing devices, said receiving device including a belt continuously movable away from said adjacent storage and releasing devices and an article retaining member associated with said belt; common conveying means mounted adjacent said receiving device and the releasing ends of the remainder of said storage and releasing devices for receiving articles released from said remainder of said storage and releasing devices and from said receiving device; and control means operable to retract said article-retaining member after the release of said batch of articles from storage to permit the transfer of articles from said belt in a group to said common conveying means.

5. In a system for dispensing articles of varied character: a plurality of storage and releasing devices; a first article receiving member mounted adjacent the releasing ends of a number less than the total number of said storage and releasing devices and adapted to receive articles selectively released from the adjacent storage and releasing devices; a second article-receiving member mounted adjacent said first article-receiving member and adapted to receive articles therefrom; a third article receiving member mounted adjacent the releasing ends of the remainder of said storage and releasing devices and adapted to receive articles selectively released therefrom; common conveying means mounted adjacent said second and third article-receiving members for receiving articles therefrom; and control means including a timing arrangement operable to effect the transfer of articles from said first article-receiving member to said second article-receiving member and from said third article receiving member to said common conveying means, and after a period determined by said timing arrangement to effect the transfer of articles from said second article-receiving member to said common conveying means.

6. In a system for dispensing articles of varied character: a plurality of storage and releasing devices; a receiving device mounted adjacent the releasing ends of a number less that the total number of said storage and releasing devices and adapted to receive a batch of articles selectively released from the adjacent storage and releasing devices, said receiving device including an article-receiving member and a pusher-bar extending along said member adjacent to the releasing ends of said adjacent storage and releasing devices; common conveying means mounted adjacent said receiving device and the releasing ends of the remainder of said storage and releasing devices for receiving articles released from said remainder of said storage and releasing devices and from said receiving device; driving means connected to said pusher-bar and operable to move said pusher-bar across said article-receiving member to transfer said released articles from said article-receiving member as a group to said common conveying means, and control means connected to said driving means and operable to actuate said driving means after the release of said batch of articles from storage.

7. In a system for dispensing articles of varied character: a plurality of storage and releasing devices; a receiving device mounted adjacent the releasing ends of a number less than the total number of said storage and releasing devices and adapted to receive a batch of articles selectively released from the adjacent storage and releasing devices, said receiving device including an article-receiving member, a pusher-bar extending along said article-receiving member adjacent to the releasing ends of said adjacent storage and releasing devices, and springs having one end stationarily secured and the other end fastened to said pusher-bar to retain said pusher-bar in its unoperated position; common conveying means mounted adjacent said receiving device and the releasing ends of the remainder of said storage and releasing devices for receiving articles released from said remainder of said storage and releasing devices and from said receiving device; driving means connected to said pusher-bar and operable to move said pusher-bar across said article-receiving member to transfer said released articles from said article-receiving member as a group to said common conveying means; and a contact device operable by said pusher-bar in its fully operated position to stop the driving means and permit the pusher-bar to be drawn back by said springs to its unoperated position.

8. In a system for dispensing articles of varied character: a plurality of storage and releasing devices; a receiving device mounted adjacent the releasing ends of a number less than the total number of said storage and releasing devices and adapted to receive a batch of articles selectively released from the adjacent storage and releasing devices, said receiving device including an article-receiving member, an article retaining member, a pusher-bar extending along said article-receiving member adjacent to the releasing ends of said adjacent storage and releasing devices, said pusher-bar being movable across said article-receiving member, and a catch positioned to temporarily hold said pusher-bar in its fully operated position and operable by said article retaining member to release said pusher-bar; common conveying means mounted adjacent said receiving device and the releasing ends of the remainder of said storage and releasing devices for receiving articles released from said remainder of said storage and releasing devices and from said receiving device; driving means connected to said pusher-bar and said article-retaining member; and control means connected to said driving means and operable after the release of said batch of articles from storage to actuate said driving means, and to concurrently retract said article-retaining member and move said pusher-bar, said pusher-bar being locked in its fully operated position by said catch, said driving means restoring said article-retaining member to its retaining position thereby releasing said pusher-bar.

9. In a system for dispensing articles of varied character: a plurality of storage and releasing devices; a receiving device mounted adjacent the releasing ends of a number less than the total number of said storage and releasing devices and adapted to receive a batch of articles selectively released from the adjacent storage and releasing devices, said receiving device including an article receiving member and a pusher-bar extending along said member adjacent to the releasing ends of said adjacent storage and releasing devices, said pusher-bar comprising a horizontal bar and a pushing member extending for the length of said horizontal bar and attachable thereto, said pushing member being held in its unoperated position at a level other than the level of said horizontal bar; common conveying means mounted adjacent said receiving device and the releasing ends of the remainder of said storage and releasing devices for receiving articles released from said remainder of said storage and releasing devices and from said receiving device; and driving means operable to move said pushing member in a direction normal to the plane of said article-receiving member, to attach said pushing member to said horizontal bar and to move said pusher-bar across said article-receiving member to transfer said released articles from said article-receiving member as a group to said common conveying means and to restore said horizontal bar and said pushing member to their unoperated positions.

10. In a system for dispensing articles of varied character: a plurality of groups of storage and releasing devices aligned vertically above each other and arranged in horizontal rows; for each said group a receiving device mounted adjacent the releasing ends of a number less than the total number of storage and releasing devices of such group and adapted to receive a batch of articles selectively released from the adjacent storage and releasing devices; an article-retaining member associated with each said receiving device to retain articles thereon, said article-retaining members being interconnected to form a framelike structure; for each said group of storage and releasing devices conveying means mounted adjacent said receiving device and the releasing ends of the remainder of said storage and releasing devices for receiving articles released from said remainder of said storage and releasing devices and from said receiving device; and control means operable to move said framelike structure to retract said article-retaining members after the release of said batches of articles from storage and to transfer articles from said receiving devices in said batches to said associated conveying means.

11. In a system for dispensing articles of varied character: a plurality of groups of storage and releasing devices aligned vertically above each other and arranged in horizontal rows; for each said group a receiving device mounted adjacent the releasing ends of a number less than the total number of storage and releasing devices of such group and adapted to receive a batch of articles selectively released from the adjacent storage and releasing devices, each said receiving device including an article-receiving member and a pusher-bar extending along said member adjacent to the releasing ends of said adjacent storage and releasing devices, each of said pusher-bars comprising a horizontal bar and a pushing member extending for the length of said horizontal bar and attachable thereto, said pushing member being held in its unoperated position at a level other than the level of said horizontal bar; an actuating mechanism common to said pushing members operable to move said pushing members simultaneously in a direction normal to the plane of said article-receiving members and to attach said pushing members to their corresponding horizontal bars; an article-retaining member associated with each of said receiving devices, said article-retaining members being interconnected to form a framelike structure; a lever mechanism linking said framelike structure with said actuating mechanism for the simultaneous operation thereof; for each said group of storage and releasing devices conveying means mounted adjacent said receiving device and the releasing ends of the remainder of said storage and releasing devices for receiving articles released from said remainder of said storage and releasing devices and from said receiving device; and control means operable to move said framelike structure after the release of said batches of articles from storage to retract said article-retaining members and to move said pusher-bars across said article-receiving members to transfer articles from said receiving devices in said batches to said associated conveying means and to restore thereafter said horizontal bars, said pushing members and said article-retaining members to their initial positions.

12. In a system for dispensing articles of varied character: plurality of storage and releasing devices; a receiving device mounted adjacent the releasing ends of a number less than the total number of said storage and releasing devices and adapted to receive a batch of articles selectively released from the adjacent storage and releasing devices, said receiving device including an article-receiving member, an article-retaining member, a pusher-bar extending along said article-receiving member adjacent to the releasing ends of said adjacent storage and releasing devices and operable to move across said article-receiving member, and a first contact device operable by said pusher-bar; common conveying means mounted adjacent said receiving device and the releasing ends of the remainder of said storage and releasing devices for receiving articles released from said remainder of said storage and releasing devices and from said receiving device; driving means connected to said pusher-bar and said article-retaining member and including a second contact device operable to control the movement of said article-retaining member, said driving means being operable after the release of said batch of articles from storage to concurrently retract said article-retaining member and move said pusher-bar; a selecting mechanism; relay means associated with each storage and releasing device and said selecting mechanism and operable by said selecting mechanism to selectively actuate said devices; a storage register electrically interposed between said selecting mechanism and said relay means to store indications representing the selection of articles from said storage and releasing devices; manually operable contact means and control relays operable thereby and electrically connected with said storage register to transfer said stored indications simultaneously to said relay means for the operation of said storage and releasing devices; a relay common to said relay means and electrically connected therewith, said common relay being operable by the selective operation of any of said relay means and releasable by the release of all said relay means; a relay circuit arrangement electrically connected with said common relay and including a timing device actuated on the operation of said common relay and electrical circuits for the actuating of said driving means, said electrical circuits including said first and second contact devices and being prepared for operating said driving means after a predetermined time period by the operation of said timing device, being completed by the release of said common relay and being interrupted thereafter by the operation of said first and second contact devices; and a slow release relay included in said relay circuit arrangement and electrically connected with said timing device and said control relays and actuated by said timing device to interrupt the operation of said control relays for a predetermined time after the release of said common relay.

13. In a system for dispensing articles of varied character: a plurality of groups of storage and releasing devices aligned vertically above each other in horizontal rows; for each said group a receiving device mounted adjacent the releasing ends of a number less than the total number of storage and releasing devices of such group and adapted to receive a batch of articles selectively released from the adjacent storage and releasing devices, each said receiving device including an article-receiving member, and a pusher-bar extending along said article-receiving member adjacent to the releasing ends of said adjacent storage and releasing devices and operable to move across said article-receiving member; an article-retaining member associated with each of said receiving devices, said article-retaining members being interconnected to form a framelike structure; a first contact device associated with and operable by one of said pusher-bars; for each said group of storage and releasing devices conveying means mounted adjacent said receiving device and the releasing ends of the remainder of said storage and releasing devices for receiving articles released from said remainder of said storage and releasing devices and from said reciving device; driving means connected to said pusher-bars for the simultaneous operation thereof, and further driving means connected to said framelike structure and including a second contact device operable to control the movement of said framelike structure, said driving means and said further driving means being operable after the release of said batches of articles from storage to move said pusher-bars to transfer said released articles from said article-receiving members in said batches to said associated conveying means, and to concurrently retract said framelike structure; a selecting mechanism; relay means associated with each storage and releasing device and said selecting mechanism and operable by said selecting mechanism to selectively actuate said devices; a relay comon to said relay means and electrically connected therewith, said common relay being operable by the selective operation of any of said relay means and releasable by the release of all said relay means; a relay circuit arrangement electrically connected to said common relay and including a timing device actuated on the operation of said common relay and electrical circuits for the actuation of said driving means and said further driving means, said electrical circuits including said first and said second contact device respectively and being prepared for operating said driving means and said further driving means after a predetermined time period by the operation of said timing device, being completed by the release of said common relay and being interrupted thereafter by the operation of said first and said second contact device respectively.

14. In a system for dispensing articles of varied character: a plurality of storage and releasing devices arranged in groups; receiving devices mounted adjacent the releasing ends of at least two groups of said storage and releasing devices and adapted to receive batches of articles selectively released from corresponding groups of storage and releasing devices, each of said receiving devices including an article-receiving member, an article-retaining member, and a pusher-bar extending along said article-receiving member adjacent to the releasing ends of said adjacent storage and releasing devices and operable to move across said article-receiving member; common conveying means mounted adjacent said receiving devices and the releasing ends of the remainder if any of said storage and releasing devices for receiving articles released from said remainder if any of said storage and releasing devices and from said receiving devices; driving means connected to each said pusher-bar and each said article-retaining number and operable after the release of a corresponding batch of articles from storage to concurrently actuate the corresponding article-retaining member and pusher-bar; a selecting mechanism; relay means associated with each storage and releasing device and said selecting mechanism and operable by said selecting mechanism to selectively actuate said devices; a storage register electrically interposed between said selecting mechanism and said relay means to store indications representing the selection of articles from said storage and releasing devices; manually operable contact means and control relays operable thereby and electrically connected with said storage register to transfer said stored indications to said relay means for the operation of said storage and releasing devices; a timing arrangement electrically interposed between the storage register and the relay means associated with at least one group of said storage and releasing devices to delay the operation of said relay means for a predetermined time after the operation of the reamining relay means; a relay common to each group of relay means and electrically connected therewith, each common relay being operable by the selective operation of any of said relay means in the corresponding group and releasable by the release of all said latter relay means; and a timing device for each of said common relays and electrically operated thereby to prepare electrical circuits for the operation of the driving means of the pusher-bars and article-retaining members associated with the corresponding group of storage and releasing devices, said latter driving means being operated at the release of the corresponding common relay.

15. An arrangement according to claim 14 in which each of said timing devices includes a slow release relay, said slow release relays being electrically interconnected with each other and said control relays to interrupt the operation of said control relays for a predetermined time after the release of all said common relays.

References Cited in the file of this patent

UNITED STATES PATENTS

| | | |
|---|---|---|
| 1,200,244 | Sears | Oct. 3, 1916 |
| 1,602,753 | Davis | Oct. 12, 1926 |
| 1,773,885 | Staley | Aug. 26, 1930 |
| 2,276,294 | Farmer | Mar. 17, 1942 |
| 2,374,537 | Goldsmith | Apr. 24, 1945 |
| 2,381,351 | Hardinge | Aug. 7, 1945 |
| 2,462,021 | Harker | Feb. 15, 1949 |
| 2,562,506 | Petersen et al. | July 31, 1951 |